US011901001B2

United States Patent
Park et al.

(10) Patent No.: US 11,901,001 B2
(45) Date of Patent: Feb. 13, 2024

(54) MEMORY DEVICE HAVING PHYSICAL UNCLONABLE FUNCTION AND MEMORY SYSTEM INCLUDING THE MEMORY DEVICE

(71) Applicant: Samsung Electronics Co., Ltd., Suwon-si (KR)

(72) Inventors: Jooyong Park, Hwaseong-si (KR); Pansuk Kwak, Goyang-si (KR); Daeseok Byeon, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 213 days.

(21) Appl. No.: 17/569,786

(22) Filed: Jan. 6, 2022

(65) Prior Publication Data
US 2022/0399056 A1    Dec. 15, 2022

(30) Foreign Application Priority Data

Jun. 15, 2021    (KR) ........................ 10-2021-0077424

(51) Int. Cl.
*G11C 7/24* (2006.01)
*G11C 16/10* (2006.01)
(Continued)

(52) U.S. Cl.
CPC .......... *G11C 13/0059* (2013.01); *G11C 5/063* (2013.01); *G11C 13/004* (2013.01);
(Continued)

(58) Field of Classification Search
CPC ............ G11C 11/4078; G11C 11/4094; G11C 11/4096; G11C 29/52; G11C 2029/5002;
(Continued)

(56) References Cited

U.S. PATENT DOCUMENTS 7,679,133 B2    3/2010 Son et al.
8,553,466 B2    10/2013 Han et al.
(Continued)

FOREIGN PATENT DOCUMENTS

KR    101169172 B1    8/2012
KR    10-2017-0087048 A    7/2017
KR    102165427 B1    10/2020

OTHER PUBLICATIONS

European Search Report dated Jul. 7, 2022 for corresponding EP Patent Application No. 22153135.3.

*Primary Examiner* — Hien N Nguyen
(74) *Attorney, Agent, or Firm* — Harness, Dickey & Pierce, P.L.C.

(57) ABSTRACT

Provided are memory devices and memory systems. The memory device includes a memory cell array in a first semiconductor layer and including word lines stacked in a first direction, and channel structures passing through the word lines in the first direction; a control logic circuit in a second semiconductor layer located below the first semiconductor layer in the first direction; and a physical unclonable function (PUF) circuit including a plurality of through electrodes passing through the first semiconductor layer and the second semiconductor layer, and configured to generate PUF data according to resistance values of the plurality of through electrodes, and generate the PUF data based on a node voltage between through electrodes connected in series, among the plurality of through electrodes.

20 Claims, 17 Drawing Sheets

(51) Int. Cl.
*G11C 13/00* (2006.01)
*G11C 5/06* (2006.01)

(52) U.S. Cl.
CPC ...... *G11C 13/0028* (2013.01); *G11C 13/0038* (2013.01); *G11C 13/0069* (2013.01)

(58) Field of Classification Search
CPC ........... G11C 16/22; G11C 16/28; G11C 7/24; G11C 2029/0411; G11C 2029/4402; G11C 8/20; G11C 11/1673; G11C 11/1675; G11C 11/1695; G11C 13/004; G11C 13/0059; G11C 13/0069; G11C 16/10; G11C 16/26
See application file for complete search history.

(56) References Cited

U.S. PATENT DOCUMENTS

| | | |
|---|---|---|
| 8,559,235 B2 | 10/2013 | Yoon et al. |
| 8,654,587 B2 | 2/2014 | Yoon et al. |
| 9,859,018 B2 | 1/2018 | Ghosh et al. |
| 10,615,989 B2 | 4/2020 | Kreft |
| 11,044,086 B2 | 6/2021 | Choi et al. |
| 2011/0233648 A1 | 9/2011 | Seol et al. |
| 2014/0159040 A1 | 6/2014 | Dimitrakopoulos et al. |
| 2015/0055417 A1* | 2/2015 | Kim .................. G09C 1/00 365/185.18 |
| 2015/0071432 A1 | 3/2015 | Zhu et al. |
| 2016/0148679 A1* | 5/2016 | Yoshimoto ........... G11C 13/004 365/148 |
| 2018/0039581 A1 | 2/2018 | Hung et al. |
| 2018/0337793 A1* | 11/2018 | Park ...................... H03K 19/003 |
| 2019/0058603 A1* | 2/2019 | Lin ...................... H04L 9/0866 |
| 2020/0084052 A1* | 3/2020 | O'Connell ............... G11C 7/24 |
| 2021/0184870 A1* | 6/2021 | Hurwitz ................. G06F 21/73 |

* cited by examiner

MEMORY DEVICE HAVING PHYSICAL UNCLONABLE FUNCTION AND MEMORY SYSTEM INCLUDING THE MEMORY DEVICE

CROSS-REFERENCE TO RELATED APPLICATION

This application is based on and claims priority under 35 U.S.C. § 119 to Korean Patent Application No. 10-2021-0077424, filed on Jun. 15, 2021, in the Korean Intellectual Property Office, the disclosure of which is incorporated by reference herein in its entirety.

BACKGROUND

The inventive concepts relate to memory devices, and more particularly, to memory devices having a physical unclonable function, memory systems including the memory device, operating methods of the memory device, and operating method of the memory systems.

According to the increased security requirements for storage devices, storage devices having a physical unclonable function (PUF) have been developed. A PUF circuit refers to a circuit which is implemented in a semiconductor chip by using a process variation generated in the manufacturing process of semiconductors, and which is configured to generate random digital values that are hard to predict. A PUF-based storage device may generate a unique key by using a PUF circuit, which may lead to enhanced security of the storage device.

SUMMARY

The inventive concepts provide memory devices and memory systems which are capable of improving the array efficiency for implementation of a physical unclonable function (PUF) and reducing complexity.

According to an aspect of the inventive concepts, there is provided a memory device including a memory cell array in a first semiconductor layer and including word lines stacked in a first direction, and channel structures passing through the word lines in the first direction; a control logic circuit in a second semiconductor layer located below the first semiconductor layer in the first direction; and a physical unclonable function (PUF) circuit including a plurality of through electrodes passing through the first semiconductor layer and the second semiconductor layer in the first direction, and configured to generate PUF data according to resistance values of the plurality of through electrodes, and generate the PUF data based on a node voltage between through electrodes connected in series, among the plurality of through electrodes.

According to another aspect of the inventive concepts, there is provided a memory device including a memory cell region including word lines stacked in a first direction, channel structures passing through the word lines in the first direction, and a first metal pad; a peripheral circuit region including a second metal pad and connected to the memory cell region in the first direction by the first metal pad and the second metal pad; and a PUF circuit including a plurality of through electrodes passing through the memory cell region in the first direction, and configured to generate PUF data according to resistance values of the plurality of through electrodes, and generate the PUF data based on a node voltage between through electrodes connected in series, among the plurality of through electrodes.

According to another aspect of the inventive concepts, there is provided a memory system including a memory device; and a memory controller configured to transmit a PUF data request command to the memory device in response to an authentication request received from a host, and generate an authentication key based on PUF data received from the memory device, wherein the memory device includes a memory cell array in a first semiconductor layer and including word lines stacked in a first direction, and channel structures passing through the word lines in the first direction; a control logic circuit in a second semiconductor layer located below the first semiconductor layer in the first direction; and a PUF circuit including a plurality of through electrodes passing through the first semiconductor layer and the second semiconductor layer in the first direction, and configured to generate the PUF data according to resistance values of the plurality of through electrodes, and generate the PUF data based on a node voltage between through electrodes connected in series, among the plurality of through electrodes.

According to another aspect of the inventive concepts, there is provided a memory system including a memory device; and a memory controller configured to transmit a PUF data request command to the memory device in response to an authentication request received from a host, and generate an authentication key based on PUF data received from the memory device, wherein the memory device includes a memory cell region including word lines stacked in a first direction, channel structures passing through the word lines in the first direction, and a first metal pad; a peripheral circuit region including a second metal pad and connected to the memory cell region in the first direction by the first metal pad and the second metal pad; and a PUF circuit including a plurality of through electrodes passing through the memory cell region in the first direction, and configured to generate PUF data according to resistance values of the plurality of through electrodes, and generate the PUF data based on a node voltage between through electrodes connected in series, among the plurality of through electrodes.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Hereinafter, embodiments of the inventive concepts will be described in detail with reference to the accompanying drawings.

Figure 1:
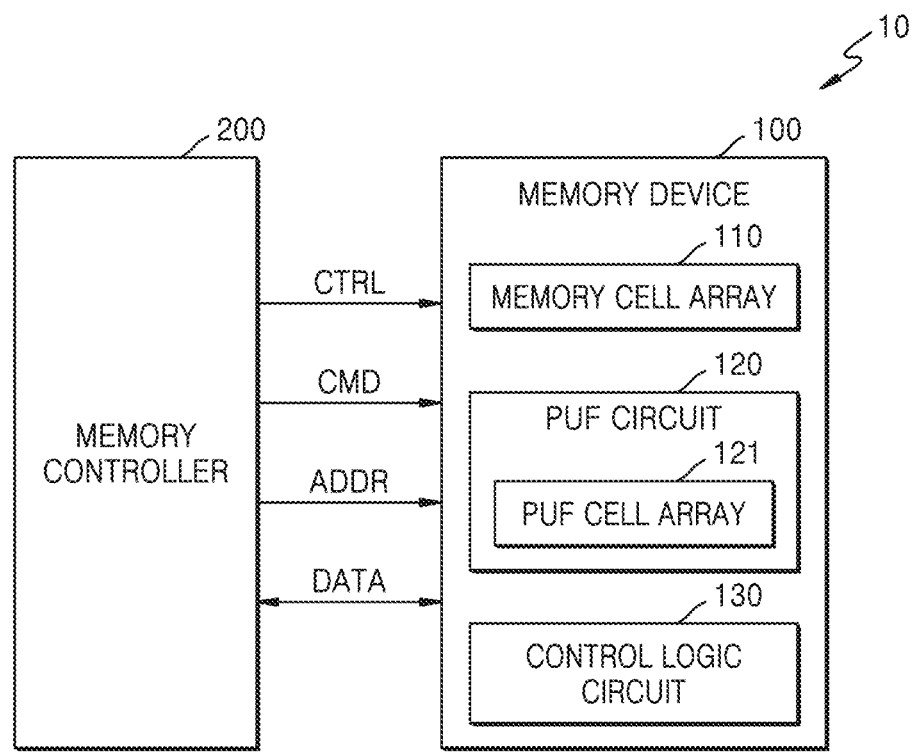
FIG. 1 is a block diagram of a memory system according to some example embodiments.

FIG. 1 is a block diagram of a memory system 10 according to some example embodiments.

With reference to FIG. 1, the memory system 10 may include a memory device 100 and a memory controller 200. The memory system 10 may be included or equipped in electronic devices, such as personal computers, servers, data centers, smartphones, tablet PCs, autonomous vehicles, portable game consoles, wearable devices, etc. For example, the memory system 10 may be implemented as a storage device, such as a solid state drive (SSD).

The memory controller 200 may control overall operations of the memory device 100. Specifically, the memory controller 200 may control the memory device 100 by providing a command CMD, an address ADDR, and/or a control signal CTRL to the memory device 100. The memory device 100 may operate according to the control by the memory controller 200. The memory device 100 may output stored data DATA or store data DATA provided from the memory controller 200 according to the control by the memory controller 200.

The memory device 100 may include a memory cell array 110, a physical unclonable function (PUF) circuit 120, and a control logic circuit 130. In some example embodiments, the memory device 100 may have a cell over periphery (COP) structure, and in this case, the memory cell array 110 may be arranged in a first semiconductor layer (e.g., L1 of FIG. 5), the control logic circuit 130 may be arranged in a second semiconductor layer (e.g., L2 of FIG. 5), and the PUF circuit 120 may be arranged across the first and second semiconductor layers. In some example embodiments, the memory device 100 may have a bonding-vertical NAND (B-VNAND) structure, and in this case, the memory cell array 110 may be arranged in a first semiconductor chip (e.g., CELL of FIG. 15), the control logic circuit 130 may be arranged in a second semiconductor chip (e.g., PERI of FIG. 15), and the PUF circuit 120 may be arranged across the first and second semiconductor chips.

The memory controller 200 (or other circuitry, for example the PUF circuit 120, control logic circuit 130, or other circuitry discussed herein, such as the voltage generator 150, page buffer unit 170, data I/O circuit 140, cell selection circuit 1221, reference voltage generator 1222, comparison circuit 1223, and combinational logic 1224) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The memory cell array 110 may include a plurality of memory cells connected to word lines and bit lines. A row address of the addresses ADDR may refer to at least one of the word lines, and a column address of the addresses ADDR may refer to at least one of the bit lines. For example, the plurality of memory cells may be flash memory cells. However, the inventive concepts are not limited thereto, and the memory cells may be resistive random access memory (RRAM) cells, ferroelectric random access memory (FRAM) cells, phase change random access memory (PRAM) cells, thyristor random access memory (TRAM) cells, magnetic random access memory (MRAM) cells, or dynamic random access memory (DRAM) cells. Hereinafter, example embodiments of the inventive concepts will be described focusing on example embodiments in which the memory cells are NAND flash memory cells.

In some example embodiments, the memory cell array 110 may include word lines stacked in a first direction (e.g., the vertical direction) and channel structures passing through the word lines and extending in the first direction, e.g., vertical channel structures. Accordingly, the memory cell array 110 may be referred to as "three-dimensional (3D) memory cell array." For example, when the memory cells are NAND flash memory cells, the memory cell array 110 may be referred to as "3D NAND memory cell array."

The PUF circuit 120 may include a PUF cell array 121 including a plurality of PUF cells. In some example embodiments, the PUF circuit 120 may include a plurality of through electrodes extending in the first direction, and the plurality of through electrodes may constitute the plurality of PUF cells. Accordingly, the PUF cell array 121 may be referred to as "PUF contact array." For example, each PUF cell may include a plurality of through electrodes connected in series between a power voltage terminal and a ground voltage terminal, and may generate an output voltage by distributing a power voltage using the plurality of through electrodes. At this time, each PUF cell may generate a unique output voltage according to variation of resistance values of the plurality of through electrodes.

The PUF circuit 120 may generate PUF data based on output voltages of the plurality of PUF cells included in the PUF cell array 121. Further, the PUF circuit 120 may generate validity data representing validity of PUF data based on output voltages of the plurality of PUF cells included in the PUF cell array 121. According to some example embodiments, the PUF data may be referred to as "random data" or "unique data." The memory controller 200 may generate an authentication key, a random key, or a unique key using the PUF data.

Specifically, the PUF circuit 120 may generate a unique value corresponding to a hardware based on intrinsic properties of the hardware, that is, an output voltage. For example, even when a plurality of hardwares, such as semiconductor devices included in a semiconductor chip are manufactured by the same semiconductor process, physically speaking, one of the plurality of hardwares may not be completely the same as another, and slight variation may occur in the plurality of hardwares. Based on such variation, a unique value of a hardware may be extracted (e.g., determined), and the extracted value may be used for applications which require security, such as secure communication, security data processing, user identification, and firmware updates, etc. In other words, the extracted value may be used to determine (e.g., authenticate) the specific piece of hardware used for the applications. The PUF data may refer to a unique value generated based on the variation or a set of such unique values.

In some example embodiments, the memory controller 200 may control the memory device 100 to store data DATA in response to a write request from a host. At this time, the control logic circuit 130 may generate various control signals to program data to the memory cell array 110 based on a command CMD, an address ADDR, and a control signal CTRL. In some example embodiments, the memory controller 200 may control the memory device 100 to output data DATA in response to a read request from the host. At this time, the control logic circuit 130 may generate various control signals to read data from the memory cell array 110 based on a command CMD, an address ADDR, and a control signal CTRL.

In some example embodiments, the memory controller 200 may control the memory device 100 to output data DATA including the PUF data in response to an authentication request from the host, generate an authentication key based on the PUF data, and provide the generated authentication key to the host. At this time, the control logic circuit 130 may generate various control signals to generate the PUF data from the PUF cell array 121 based on a command CMD, an address ADDR, and a control signal CTRL.

Figure 2:
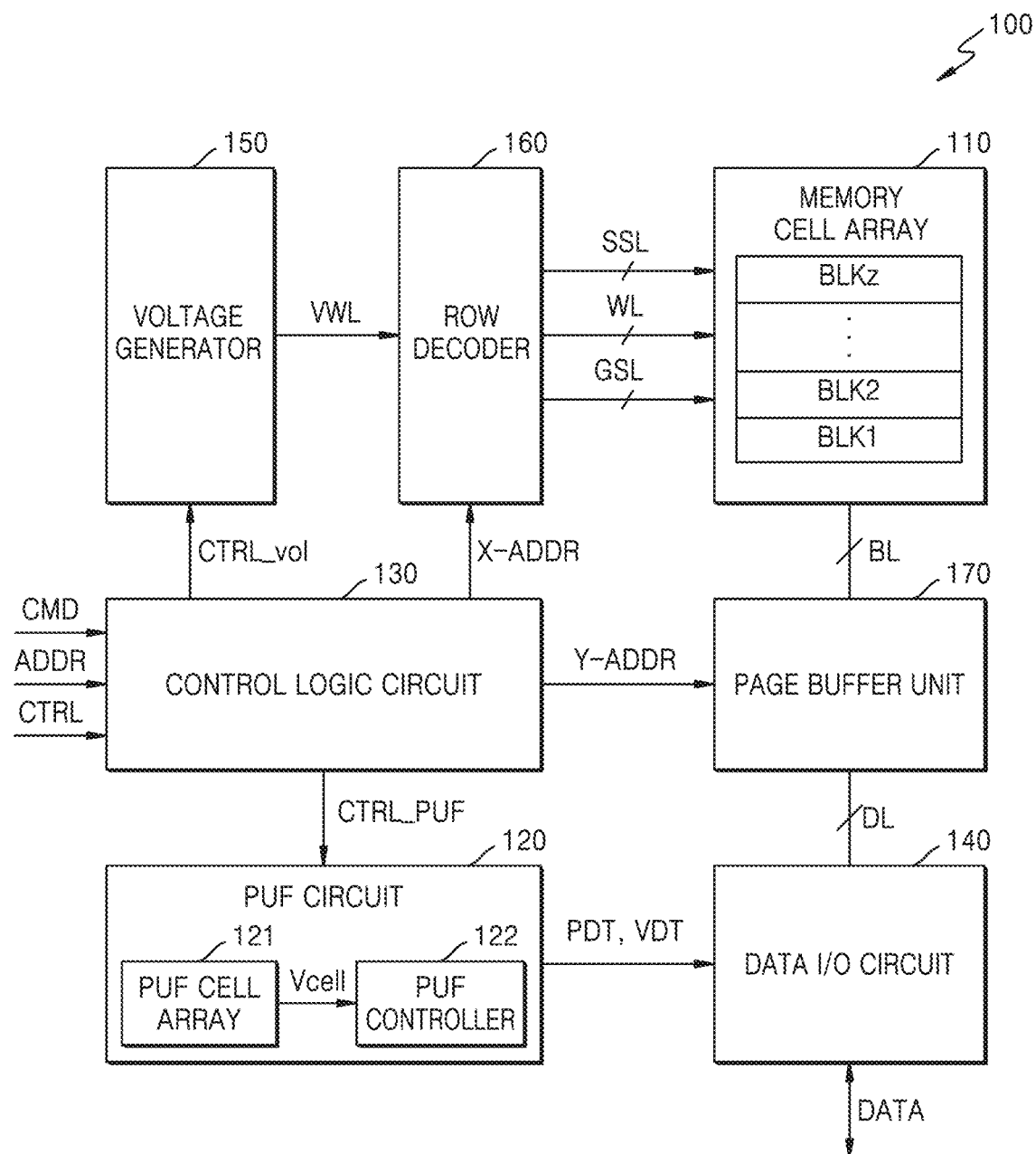
FIG. 2 is a block diagram of the memory device of FIG. 1, according to some example embodiments.

FIG. 2 is a block diagram of the memory device of FIG. 1 according to some example embodiments.

With reference to FIG. 2, the memory device 100 may include the memory cell array 110, the PUF circuit 120, the control logic circuit 130, a data input/output circuit 140, a voltage generator 150, a row decoder 160, and a page buffer circuit 170. According to some example embodiments, the PUF circuit 120, the control logic circuit 130, the data input/output circuit 140, the voltage generator 150, the row decoder 160, and the page buffer circuit 170 may be collectively referred to as a "peripheral circuit."

The memory cell array 110 may include a plurality of memory blocks BLK1 to BLKz (z is a positive integer). Each of the plurality of memory blocks BLK1 to BLKz may include a plurality of memory cells. The memory cell array 110 may be connected to the page buffer circuit 170 through the bit lines BL, and to the row decoder 160 through the word lines WL, string selection lines SSL, and ground selection lines GSL.

In some example embodiments, the memory cell array 110 may include a three-dimensional (3D) memory cell array including a plurality of NAND strings, and this will be described in detail with reference to FIGS. 4 to 6B. U.S. Pat. Laid-Open Publication Nos. 7,679,133, 8,553,466, 8,654,587, and 8,559,235, and U.S. Patent Application Publication No. 2011/0233648 disclose proper configurations for a 3D memory cell array consisting of multiple levels among which word lines and/or bit lines are shared, and the disclosures thereof are incorporated by reference herein.

The PUF circuit 120 may include the PUF cell array 121 and a PUF controller 122. The PUF cell array 121 may include a plurality of PUF cells, and the plurality of PUF cells may include a plurality of through holes (e.g., the first to third through electrodes THV1, THV2, and THV3 of FIG. 6). Specifically, each PUF cell may generate an output voltage Vcell from the power voltage (e.g., power supply voltage) by implementing a voltage divider using the plurality of through electrodes. The PUF controller 122 may generate the PUF data PDT and the validity data VDT from the output voltage Vcell of each PUF cell based on the PUF control signal CTRL_PUF, and provide the generated PUF data PDT and the validity data VDT to the data input/output circuit 140.

The control logic circuit 130 may output various control signals to program data to the memory cell array 110, to read data from the memory cell array 110, or to erase data stored in the memory cell array 110, e.g., a voltage control signal CTRL_vol, a row address X-ADDR, and a column address Y-ADDR based on the command CMD, the address ADDR, and the control signal CTRL. Further, the control logic circuit 130 may output various signals to generate the PUF data by the PUF circuit 120, e.g., the PUF control signal CTRL_PUF and the voltage control signal CTRL_vol based on the command CMD, the address ADDR, and the control signal CTRL. For example, the PUF control signal CTRL_PUF may include a PUF cell selection signal, a reference voltage set signal, or a clock signal, etc. In this manner, the control logic circuit 130 may generally control various operations in the memory device 100.

The voltage generator 150 may generate various voltages for performing operations of programming, reading, and erasing on the memory cell array 110 and/or various voltages for performing generation of the PUF data by the PUF circuit 120 based on the voltage control signal CTRL_vol. Specifically, the voltage generator 150 may generate a word line voltage VWL, for example, a program voltage, a read voltage, a pass voltage, an erase verification voltage, or a program verification voltage, etc. In addition, the voltage generator 150 may further generate a string selection line voltage and a ground selection line voltage based on the voltage control signal CTRL_vol. Further, the voltage generator 150 may generate a power voltage (e.g., VDD of FIG. 8) to be provided to the PUF circuit 120 based on the voltage control signal CTRL_vol.

The row decoder 160 may select one of the plurality of memory blocks BLK1 to BLKz in response to the row address X-ADDR, select one of the word lines WL of the selected memory block, and select one of the plurality of string selection lines SSL. The page buffer circuit 170 may select some of the bit lines BL in response to the column address Y-ADDR. Specifically, the page buffer circuit 170 may operate as a writing driver or a sense amplifier according to an operation mode.

Figure 3:
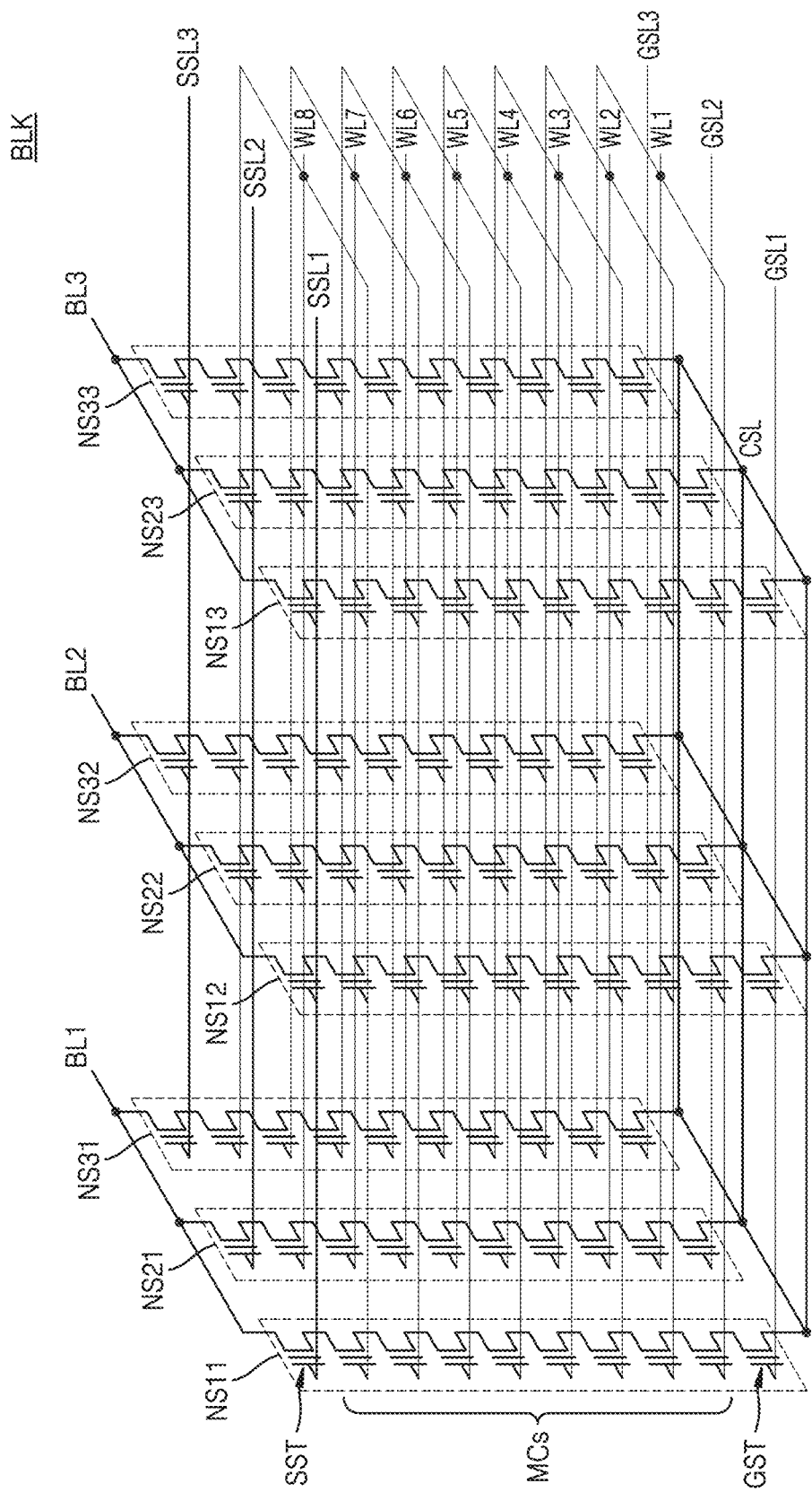
FIG. 3 is a circuit diagram of a memory block according to some example embodiments.

FIG. 3 is a circuit diagram of a memory block according to some example embodiments.

With reference to FIG. 3, a memory block BLK may correspond to one of the plurality of memory blocks BLK1 to BLKz of FIG. 2. The memory block BLK may include NAND strings NS11 to NS33, and each NAND string (e.g., NS11) may include a string selection transistor SST, a plurality of memory cells MCs, and a ground selection transistor GST connected in series. The transistors SST and GST and the memory cells MCs included in each NAND string may form a structure stacked in the vertical direction on a substrate.

The word lines WL1 to WL8 may extend in a second horizontal direction, and the bit lines BL1 to BL3 may extend in a first horizontal direction. The NAND strings NS11, NS21, and NS31 may be arranged between the first bit line BL1 and the common source line CSL, the NAND strings NS12, NS22, and NS32 may be arranged between the second bit line BL2 and the common source line CSL, and the NAND strings NS13, NS23, and NS33 may be arranged between the third bit line BL3 and the common source line CSL. The string selection transistor SST may be connected to a corresponding string selection line SSL1 to SSL3. The memory cells MCs may be respectively connected to corresponding word lines WL1 to WL8. The ground selection transistor GST may be connected to a corresponding ground selection line GSL1 to GSL3. The string selection transistor SST may be connected to a corresponding bit line, and the ground selection transistor GST may be connected to the common source line CSL. Here, the number of the NAND strings, the number of the word lines, the number of the bit lines, the number of the ground selection lines, and the number of the string selection lines may be changed according to some example embodiments.

Figure 4A:
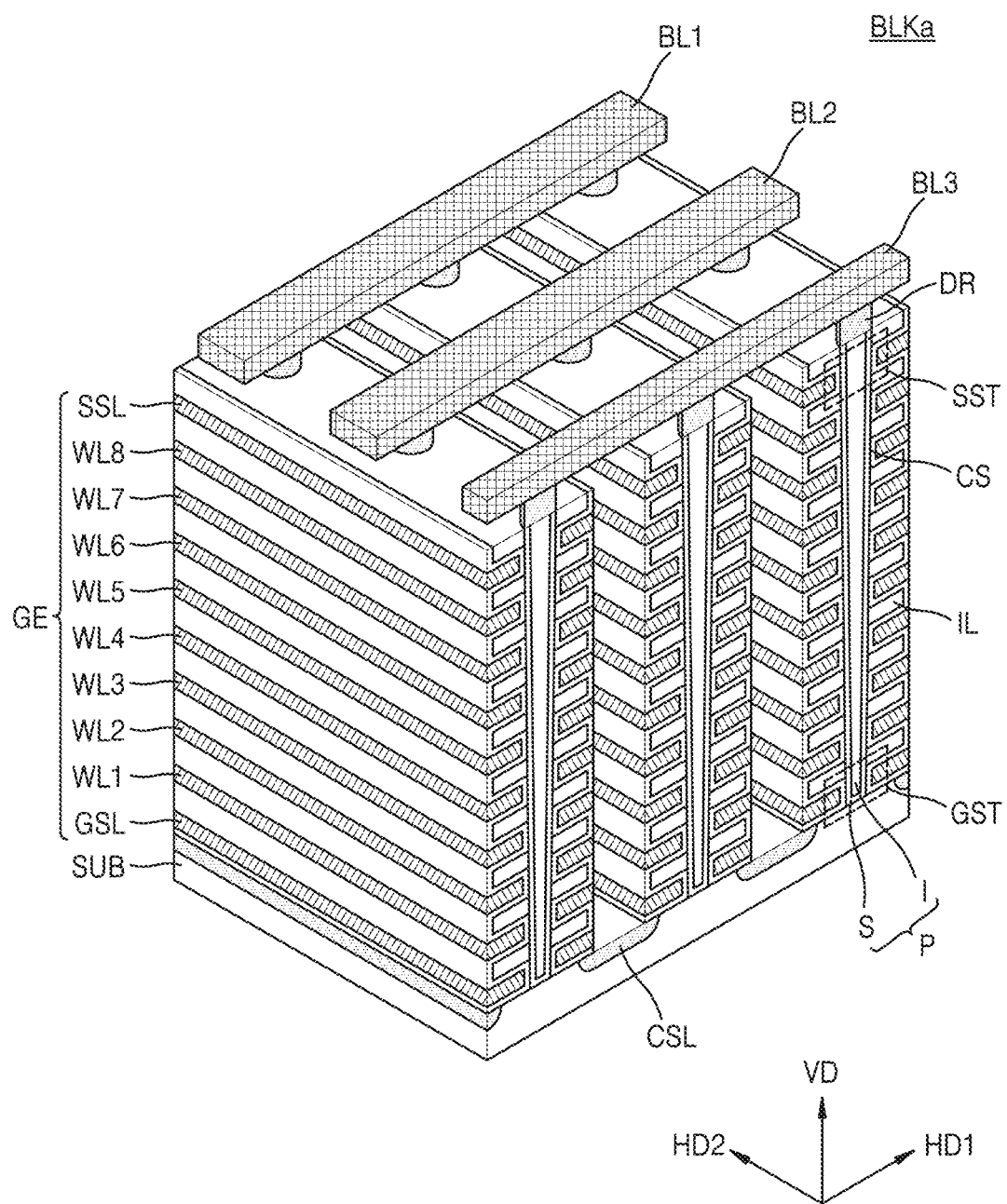
FIG. 4A is a perspective view of a memory block according to some example embodiments.

FIG. 4A is a perspective view of a memory block BLKa according to some example embodiments.

With reference to FIG. 4A, a memory block BLKa may correspond to one of the plurality of memory blocks BLK1 to BLKz of FIG. 2. The memory block BLKa may be formed in the vertical direction of the substrate SUB. The substrate SUB may have a first conductivity type (e.g., p type), and the common source line CSL extending in the second horizontal direction HD2 and doped with second conductivity type (e.g., n type) impurities may be provided on the substrate SUB. On an area of the substrate SUB between two adjacent common source lines CSL, a plurality of insulating films IL extending in the second horizontal direction HD2 may be provided sequentially in the vertical direction VD, and the plurality of insulating films IL may be spaced apart from each other at a certain distance in the vertical direction VD. For example, the plurality of insulating films IL may include an insulating material such as a silicon oxide.

On an area of the substrate SUB between two adjacent common source lines CSL, a plurality of pillars P arranged sequentially in the first horizontal direction HD1, and passing through the plurality of insulating films IL in the vertical direction VD may be provided. For example, the plurality of pillars P may be in contact with the substrate SUB by passing through the plurality of insulating films IL. Specifically, a surface layer S of each pillar P may include a first type silicon material and may function as a channel area. Meanwhile, an inner layer I of each pillar P may include an insulating material such as a silicon oxide or an air gap.

In an area between two adjacent common source lines CSL, a charge storage layer CS may be provided along the insulating layers IL, the pillars P, and an exposed surface of the substrate SUB. The charge storage layer CS may include a gate insulating layer (or a "tunneling insulating layer"), a charge trap layer and a blocking insulating layer. For example, the charge storage layer CS may have an oxide-nitride-oxide (ONO) structure. Further, in the area between two adjacent common source lines CSL, gate electrodes GE such as selection lines GSL and SSL, and word lines WL1 to WL8 may be provided on an exposed surface of the charge storage layer CS.

On the plurality of pillars P, drains or drain contacts DR may be provided. For example, the drains or drain contacts DR may include silicon materials doped with second type conductivity impurities. On the drains DR, the bit lines BL1 to BL3 extending in the first horizontal direction HD1 and spaced apart from each other at a certain distance in the second horizontal direction HD2 may be provided.

Figure 4B:
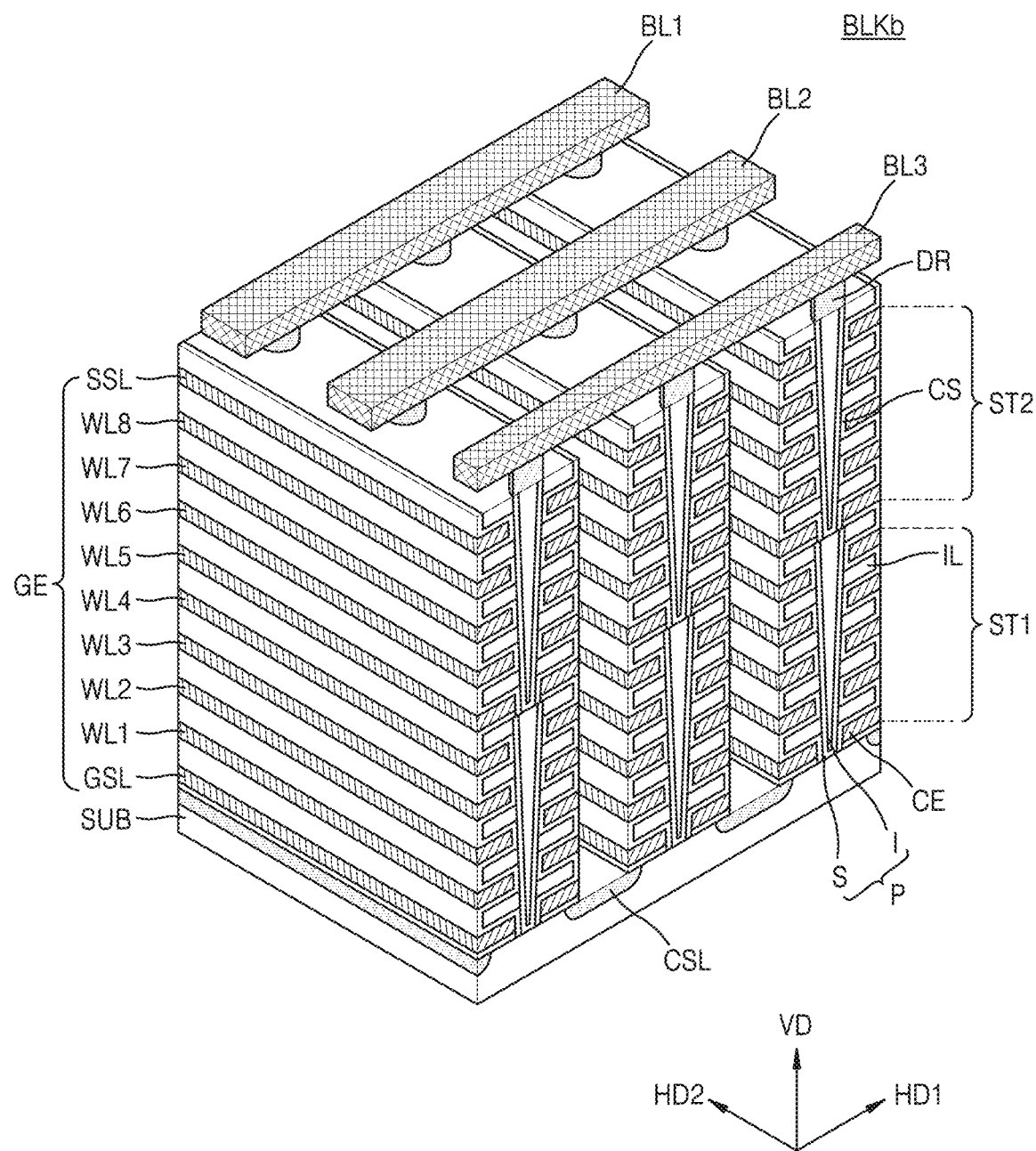
FIG. 4B is a perspective view of a memory block according to some example embodiments.

FIG. 4B is a perspective view of a memory block BLKb according to some example embodiments.

With reference to FIG. 4B, a memory block BLKb may correspond to one of the plurality of memory blocks BLK1 to BLKz of FIG. 2. In addition, the memory block BLKb may correspond to a variation of the example embodiment of the memory block BLKa of FIG. 4A, and the descriptions made above with reference to FIG. 4A may also be applied to this example embodiment. The memory block BLKb may be formed in the vertical direction of the substrate SUB. The memory block BLKb may include a first memory stack ST1 and a second memory stack ST2 stacked in the vertical direction VD.

Figure 5:
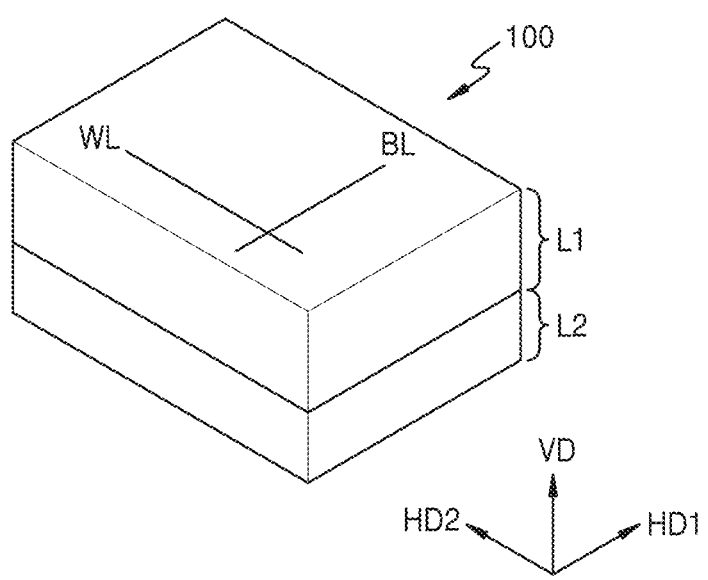
FIG. 5 is a schematic diagram of the memory device of FIG. 2, according to some example embodiments.

FIG. 5 is a schematic diagram of the memory device 100 of FIG. 2 according to some example embodiments.

With reference to FIG. 5, the memory device 100 may include a first semiconductor layer L1 and a second semiconductor layer L2, and the first semiconductor layer L1 may be stacked in the vertical direction VD with respect to the second semiconductor layer L2. Specifically, the second semiconductor layer L2 may be arranged below the first semiconductor layer L1 in the vertical direction VD, and accordingly, the second semiconductor layer L2 may be arranged near the substrate.

In some example embodiments, the memory cell array 110 of FIG. 2 may be formed in the first semiconductor layer L1, and the peripheral circuit including the control logic circuit 130, the data input/output circuit 140, the voltage generator 150, the row decoder 160, and the page buffer circuit 170 may be formed in the second semiconductor layer L2. Accordingly, the memory device 100 may have a structure in which the memory cell array 110 is arranged above the peripheral circuit, that is, a COP structure. The COP structure may effectively reduce an area in the horizontal direction, and improve the degree of integration of the memory device 100.

In some example embodiments, the PUF cell array 121 of FIG. 2 may include a plurality of through electrodes that pass through the first semiconductor layer L1 and the second semiconductor layer L2 in the vertical direction VD. As such, the PUF cell array 121 may be arranged across the first semiconductor layer L1 and the second semiconductor layer L2. At this time, the PUF controller 122 may be arranged in the second semiconductor layer L2. However, the inventive concepts are not limited thereto, and the PUF controller 122 may also be arranged in the first semiconductor layer L1.

In some example embodiments, the second semiconductor layer L2 may include a substrate, and by forming transistors and metal patterns for wiring the transistors (e.g., first to third lower metal lines LM1, LM2, and LM3 of FIG. 6) on the substrate, a peripheral circuit may be formed in the second semiconductor layer L2. After the peripheral circuit is formed in the second semiconductor layer L2, the first semiconductor layer L1 including the memory cell array 110 may be formed, and metal patterns for electrically connecting the word lines WL and bit lines BL of the memory cell array 110 to the peripheral circuit formed in the second semiconductor layer L2 may be formed. For example, the bit lines BL may extend in the first horizontal direction HD1, and the word lines WL may extend in the second horizontal direction HD2. For example, the memory block BLKa of FIG. 4A or the memory block BLKb of FIG. 4B may be formed in the first semiconductor layer L1.

Figure 6:
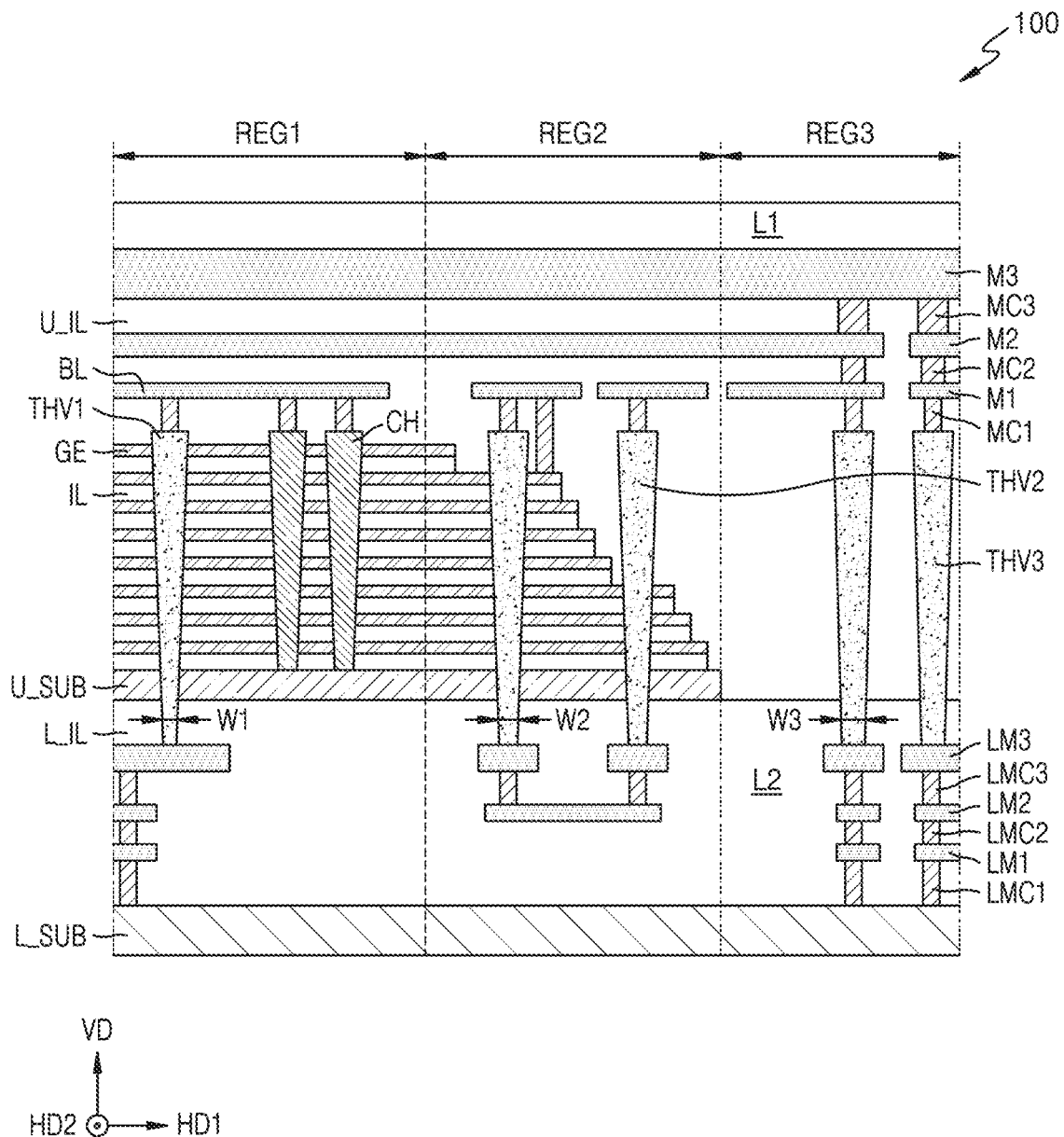
FIG. 6 is a cross-sectional diagram of a memory device having a cell over periphery (COP) structure according to some example embodiments.

FIG. 6 is a cross-sectional diagram of a memory device 100 having a cell over periphery (COP) structure according to some example embodiments.

With reference to FIG. 6, the second semiconductor layer L2 may include a lower substrate L_SUB, lower contacts LMC1, LMC2, and LMC3, and lower conductive lines LM1, LM2, and LM3, and the lower substrate L_SUB, the lower contacts LMC1, LMC2, and LMC3, and the lower conductive lines LM1, LM2, and LM3 may be covered with a lower insulating layer L_IL. For example, the PUF controller 122, the control logic circuit 130, the data input/output circuit 140, the voltage generator 150, the row decoder 160, and/or the page buffer circuit 170 of FIG. 2 may be arranged in the second semiconductor layer L2.

The first semiconductor layer L1 may include an upper substrate U_SUB, gate electrodes GE, insulating films IL, channel structures CH, a first through electrode THV1, a second through electrode THV2, a third through electrode THV3, upper contacts MC1, MC2, and MC3, and upper conductive lines M1, M2, and M3, and the upper substrate U_SUB, the gate electrodes GE, the insulating films IL, the channel structures CH, the first to third through electrodes THV1, THV2, and THV3, the upper contacts MC1, MC2, and MC3, and the upper conductive lines M1, M2, and M3 may be covered with an upper insulating layers U_IL. For example, the memory cell array 110 of FIG. 2 may be arranged in the first semiconductor layer L1.

The gate electrodes GE may be stacked on the upper substrate U_SUB in the vertical direction VD, and include the selection lines GSL and SSL, and the word lines WL1 to WL8 of FIGS. 4A and 4B. The insulating films IL and the gate electrodes GE may be arranged alternately, and the insulating films IL may correspond to the insulating films IL of FIG. 4. The channel structures CH may extend in the vertical direction VD by passing through the gate electrodes GE and the insulating films IL, and may be spaced apart from each other at a certain distance in the first horizontal direction HD1 and the second horizontal direction HD2. The channel structures CH may include the pillar P, the charge storage layer CS, and the drain contact DR of FIGS. 4A and 4B. The descriptions made with reference to FIGS. 4A and 4B may be applied to this example embodiment as well.

The first to third through electrodes THV1, THV2, and THV3 may pass through the first and second semiconductor layers L1 and L2 in the vertical direction VD, thereby electrically connecting the first semiconductor layer L1 and the second semiconductor layer L2. For example, the bit line BL arranged in the first semiconductor layer L1 may be connected to the page buffer circuit (e.g., 170 of FIG. 2) arranged in the second semiconductor layer L2 through the first through electrode THV1.

The first semiconductor layer L1 may be divided into a first region REG1, a second region REG2, and a third region REG3. The first region REG1 may correspond to the cell region where the channel structures CH are arranged, the second region REG2 may correspond to the word line step region, and the third region REG3 may correspond to the peripheral region. The first to third through electrodes THV1, THV2, and THV3 may be arranged across the first to third regions REG1, REG2, and REG3. The first to third through electrodes THV1, THV2, and THV3 may extend in the vertical direction VD, and may be spaced apart from each other at a certain distance in the first horizontal direction HD1 and the second horizontal direction HD2.

The first through electrode THV1 may be formed passing through the gate electrodes GE and the insulating films IL of the first region REG1, and the stacked structure of the gate electrodes GE and the insulating films IL of the first region REG1 may correspond to, for example, an oxide/nitride mold region. The second through electrode THV2 may be formed passing through the gate electrodes GE and the insulating films IL of the second region REG2, and the stacked structure of the gate electrodes GE and the insulating films IL of the second region REG2 may correspond to, for example, an oxide/nitride mold region. At this time, the height of the stacked structure of the gate electrodes GE and the insulating films IL of the second region REG2 may be lower than that of the stacked structure of the gate electrodes GE and the insulating films IL of the first region REG1. The third through electrodes THV3 may be formed passing through the upper insulating layer U_IL of the third region REG3, and the upper insulating layer U_IL of the third region REG3 may correspond to, for example, an oxide region.

As such, due to the difference in type and composition ratio of materials of the first to third regions REG1, REG2, and REG3, even when the height of the first to third through electrodes THV1, THV2, and THV3 is same, the dispersion of resistance values of the first to third through electrodes THV1, THV2, and THV3 may be different. In this regard, detailed descriptions will be further provided with reference to FIG. 7.

Figure 7:
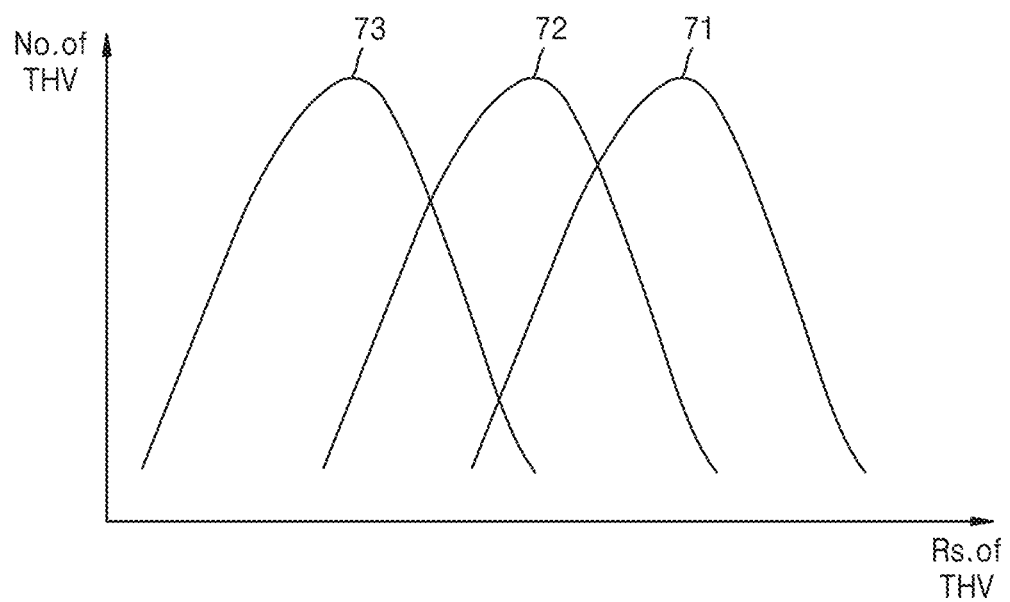
FIG. 7 is a graph showing dispersion of resistance values of a through electrode according to some example embodiments.

FIG. 7 is a graph showing dispersion of resistance values of a through electrode according to some example embodiments.

With reference to FIGS. 6 and 7, the horizontal axis represents resistance values of the through electrode, and the vertical axis represents the number of the through electrodes. A first dispersion 71 represents dispersion of resistance values of the first through electrode THV1 arranged in the first region REG1, a second dispersion 72 represents dispersion of resistance values of the second through electrode THV2 arranged in the second region REG2, and a third dispersion 73 represents dispersion of resistance values of the third through electrode THV3 arranged in the third region REG3.

As the first through electrode THV1 is formed by passing through a plurality of gate electrodes GE and insulating films IL, the width of a through hole for forming the first through electrode THV1 may be formed relatively narrow. Accordingly, a first bottom width W1 of the first through electrode THV1 in contact with the lower metal line LM3 may be the smallest, and the resistance value of the first through electrode THV1 may be greater than those of the second and third through electrodes THV2 and THV3.

As the second through electrode THV2 is formed by passing through fewer gate electrodes GE and insulating films IL, compared to the first through electrode THV1, the width of a through hole for forming the second through electrode THV2 may be wider than that of the through hole for forming the first through electrode THV1. Accordingly, a second bottom width W2 of the second through electrode THV2 in contact with the lower metal line LM3 may be greater than the first bottom width W1. Accordingly, the resistance value of the second through electrode THV2 may be smaller than the resistance value of the first through electrode THV1.

As the third through electrode THV3 is formed by passing through the upper insulating layer U_IL, the width of a through hole for forming the third through electrode THV3 may be greater than those of through holes for forming the first and second through electrodes THV1 and THV2. Accordingly, a third bottom width W3 of the third through electrode THV3 in contact with the lower metal line LM3 may be greater than the first bottom width W1 and the second bottom width W2. Accordingly, the resistance value of the third through electrode THV3 may be smaller than the resistance values of the first and second through electrodes THV1 and THV2.

According to these example embodiments, each of the PUF cells included in the PUF cell array (e.g., 121 of FIG. 2) may include the first through electrode THV1, the second through electrode THV2, and/or the third through electrode THV3. Each PUF cell may include a plurality of through electrodes connected in series between a power voltage terminal and a ground voltage terminal, and may generate an output voltage from the power voltage according to the resistance values of the through electrodes. For example, when the first PUF cell includes the first and third through electrodes THV1 and THV3, and the second PUF cell includes the second and third through electrodes THV2 and THV3, a first output voltage of the first PUF cell may be generated based on the resistance values of the first and third through electrodes THV1 and THV3, and a second output voltage of the second PUF cell may be generated based on the resistance values of second and third through electrodes THV2 and THV3. At this time, the difference between the first output voltage and the second output voltage may be significant. In other words, it may be possible to consistently tell the difference between the first output voltage and the second output voltage. The PUF circuit 120 may generate PUF data based on the first and second output voltages.

Figure 8:
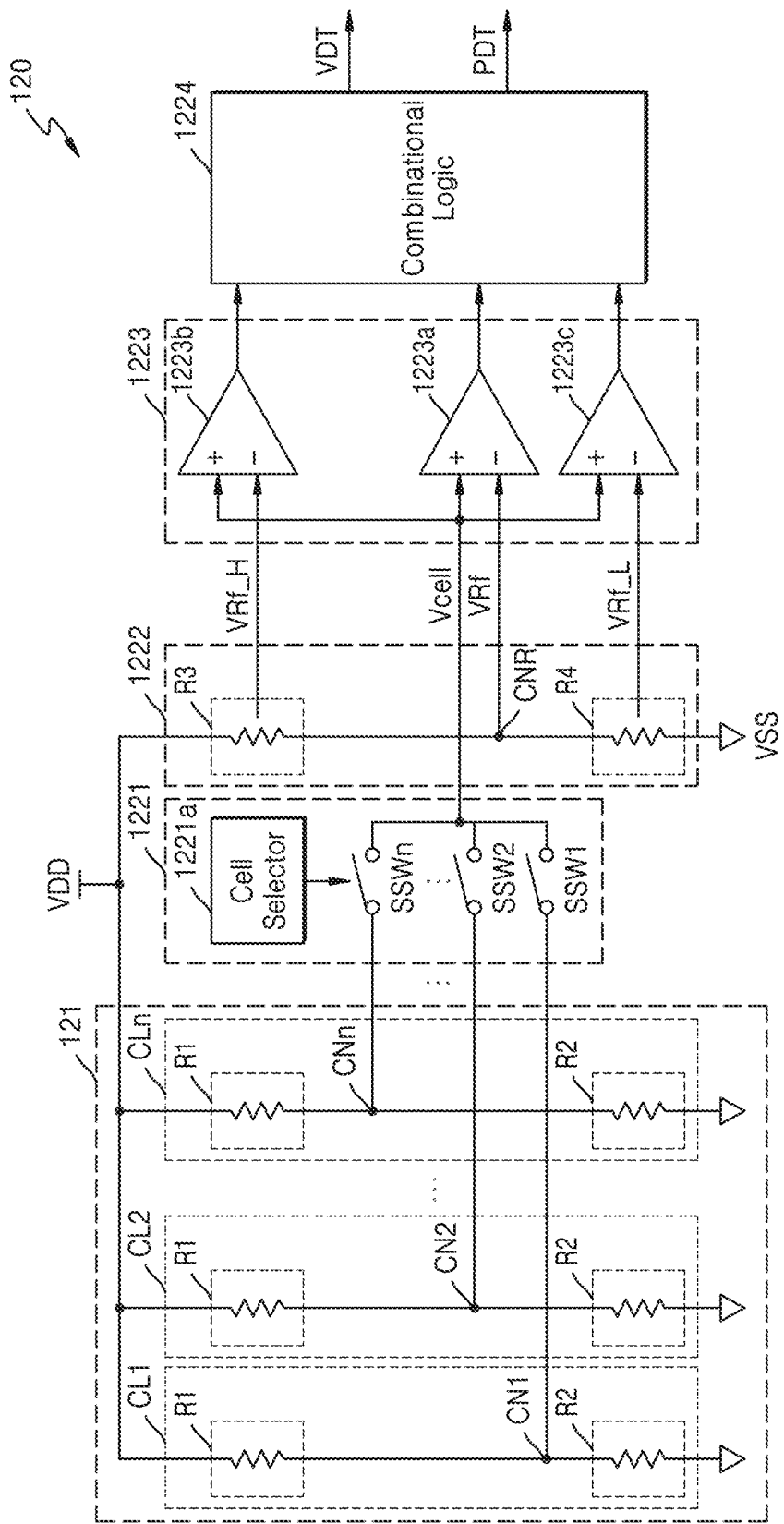
FIG. 8 is a circuit diagram of a physical unclonable function (PUF) circuit according to some example embodiments.

FIG. 8 is a circuit diagram of a PUF circuit 120 according to some example embodiments.

With reference to FIG. 8, the PUF circuit 120 may include the PUF cell array 121, a cell selection circuit 1221, a reference voltage generator 1222, a comparison circuit 1223, and a combinational logic 1224. At this time, the cell selection circuit 1221, the reference voltage generator 1222, the comparison circuit 1223, and the combinational logic 1224 may constitute the PUF controller 122 of FIG. 2.

The PUF cell array 121 may include a plurality of PUF cells CL1 to CLn, and each of the plurality of PUF cells CL1 to CLn may generate an output voltage Vcell by distributing the power voltage VDD using resistive elements. Specifically, each of the plurality of PUF cells CL1 to CLn may include a first resistive element R1 and a second resistive element R2, and each of the first resistive element R1 and the second resistive element R2 may include at least one through electrode (e.g., THV1, THV2, and THV3 of FIG. 6).

For example, in the first PUF cell CL1, the first resistive element R1 and the second resistive element R2 may be connected in series. The power voltage VDD may be applied to one end of the first resistive element R1, and a ground voltage VSS may be applied to one end of the second resistive element R2. From a connection node CN1 of the first resistive element R1 and the second resistive element R2, the output voltage Vcell of the first PUF cell CL1 may be output. Accordingly, the first resistive element R1 and the second resistive element R2 may operate as a voltage divider.

Figure 9:
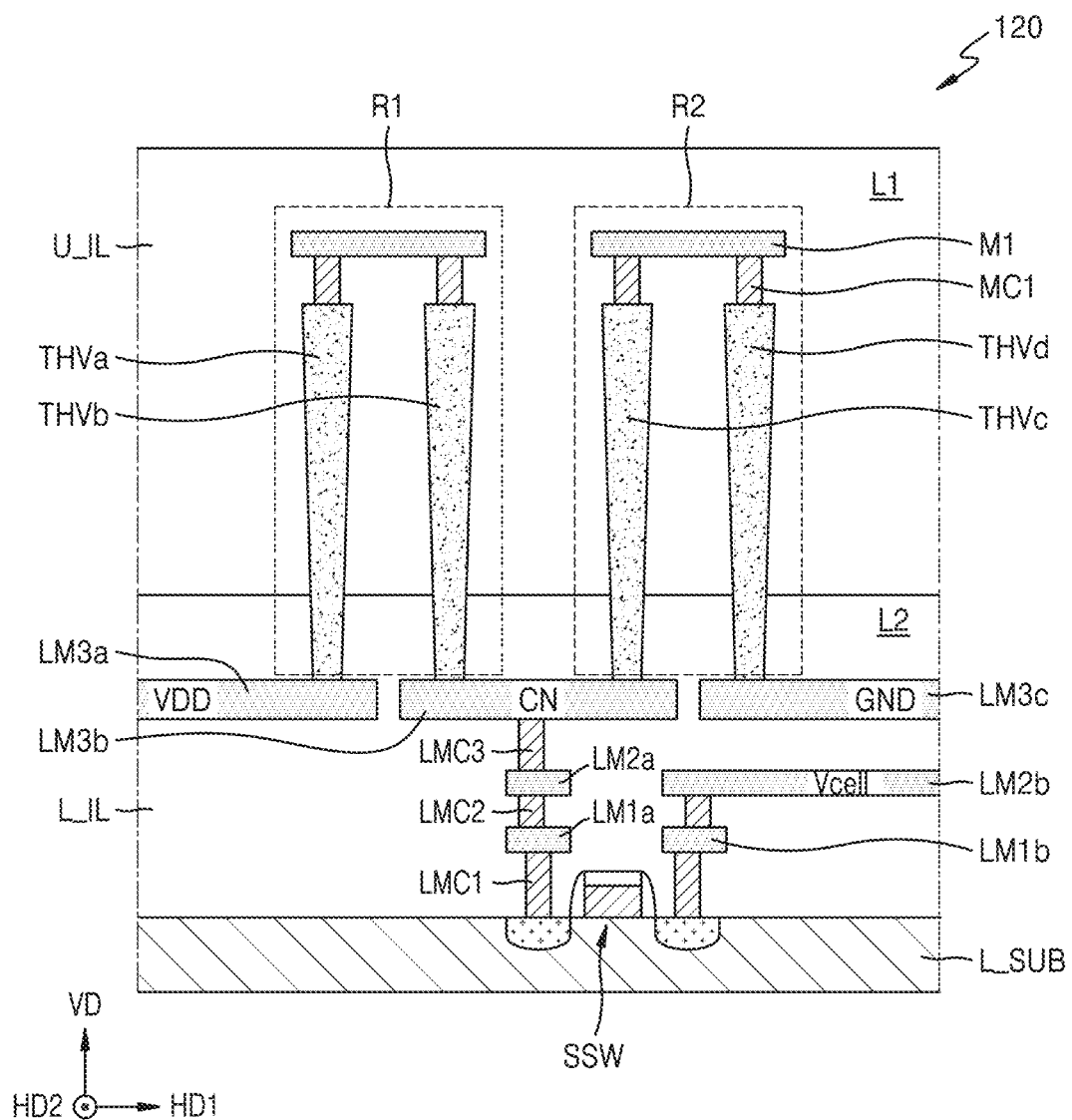
FIG. 9 is a cross-sectional diagram of a PUF circuit according to some example embodiments.

FIG. 9 is a cross-sectional diagram of a PUF circuit 120 according to some example embodiments.

With reference to FIGS. 8 and 9, the PUF circuit 120 may be arranged across the first semiconductor layer L1 and the second semiconductor layer L2. Here, the first and second semiconductor layers L1 and L2 may correspond to the first and second semiconductor layers L1 and L2 of FIG. 5, respectively. The first semiconductor layer L1 may be arranged on the second semiconductor layer L2 in the vertical direction VD. The second semiconductor layer L2 may include a lower substrate L_SUB, a cell selection switch SSW formed on the lower substrate L_SUB, lower contacts LMC1, LMC2, and LMC3 electrically connected to the cell selection switch SSW, and lower conductive lines LM1a, LM1b, LM2a, LM2b, LM3a, LM3b, and LM3c electrically connected to the lower contacts. The lower substrate L_SUB, the cell selection switch SSW, the lower contacts LMC1, LMC2, and LMC3, and the lower conductive lines LM1a, LM1b, LM2a, LM2b, LM3a, LM3b, and LM3c may be covered with a lower insulating layer L_IL. The first semiconductor layer L1 may include through electrodes THVa to THVd, an upper contact MC1, and an upper conductive line M1, and the through electrodes THVa to THVd, the upper contact MC1, and the upper conductive line M1 may be covered with an upper insulating layer U_IL.

The through electrodes THVa to THVd may pass through the first and second semiconductor layers L1 and L2 in the vertical direction VD. In some example embodiments, the through electrodes THVa to THVd may extend in the vertical direction by passing through the upper insulating layer U_IL and the lower insulating layer L_IL. Although it is not shown in the drawings, the first semiconductor layer L1 may further include gate electrodes stacked in the vertical direction VD, and also, the first semiconductor layer L1 may further include through electrodes extending in the vertical direction by passing through the gate electrodes, the upper insulating layer U_IL and the lower insulating layer L_IL. For example, each of the through electrodes THVa to THVd may correspond to one of the first to third through electrodes THV1 to THV3 of FIG. 6, respectively.

For example, the through electrodes THVa and THVb may constitute the first resistive element R1. One end of the through electrode THVa may be connected to the lower conductive line LM3a to which the power voltage VDD is applied, and another end of the through electrode THVa may be connected to the upper conductive line M1 through the upper contact MC1. One end of the through electrode THVb may be connected to the upper conductive line M1 through the upper contact MC1, and another end of the through electrode THVb may be connected to the lower conductive line LM3b corresponding to the connection node CN. At this time, the connection node CN may correspond to one of the connection nodes CN1 to CNn of FIG. 8.

For example, the through electrodes THVc and THVd may constitute the second resistive element R2. One end of the through electrode THVc may be connected to the lower conductive line LM3b corresponding to the connection node CN, and another end of the through electrode THVc may be connected to the upper conductive line M1 through the upper contact MC1. One end of the through electrode THVd may be connected to the upper conductive line M1 through the upper contact MC1, and another end of the through electrode THVd may be connected to the lower conductive line LM3c to which the ground voltage VSS is applied.

As such, the through electrode THVb and the through electrode THVc may be electrically connected to each other through the connection node CN, and thus, the first resistive element R1 and the second resistive element R2 may be connected in series. Further, as the through electrodes THVa to THVd are connected in series between the lower conductive line LM3a to which the power voltage VDD is applied and the lower conductive line LM3c to which the ground voltage VSS is applied, the first resistive element R1 and the second resistive element R2 may generate the output voltage Vcell from the connection node CN by distributing the power voltage VDD.

In some example embodiments, a resistance value of the first resistive element R1 may be identical to a resistance value of the second resistive element R2. More specifically, a target resistance value of the first resistive element R1 may be identical to a target resistance value of the second resistive element R2. For example, the output voltage Vcell of the first PUF cell CL1 may be ½ times greater than the power voltage VDD. However, the mismatches that occur in the process of manufacturing semiconductors may generate differences in resistance values between the first resistive element R1 and the second resistive element R2, and such differences may turn up as errors in the output voltage of the first PUF cell CL1. A data value corresponding to the first PUF cell CL1 may be determined according to the output voltage Vcell of the first PUF cell CL1, e.g., by errors in the output voltage. The greater the errors in the output voltage Vcell are, the more stable the data value of the first PUF cell CL1 may remain.

In some example embodiments, a resistance value of the first resistive element R1 may be different than a resistance value of the second resistive element R2. More specifically, a target resistance value of the first resistive element R1 may be different than a target resistance value of the second resistive element R2. For example, the output voltage Vcell of the first PUF cell CL1 may be ⅓ times greater than the power voltage VDD. However, the mismatches that occur in the process of manufacturing semiconductors may generate differences in resistance values between the first resistive element R1 and the second resistive element R2, and such differences may turn up as errors in the output voltage of the first PUF cell CL1. A data value corresponding to the first PUF cell CL1 may be determined according to the output voltage Vcell of the first PUF cell CL1, e.g., by errors in the output voltage. The greater the errors in the output voltage Vcell are, the more stable the data value of the first PUF cell CL1 may remain.

The first resistive element R1 and the second resistive element R2 may be resistive elements of the same type, for example, through electrodes including the same materials and having the same height. Accordingly, changes in the resistance values of the first resistive element R1 and the second resistive element R2 according to changes in the temperature, voltage, test conditions, and environmental changes, such as deterioration, etc. may have the same tendency. For example, an increment in resistance value of the first resistive element R1 according to increase of temperature may be similar to an increment in resistance value of the second resistive element R2. Accordingly, even when the environment changes, the output voltage of the first PUF cell CL1 may remain relatively constant.

The configuration and structure of other PUF cells CL2 to CLn may be identical to those of the first PUF cell CL1. Accordingly, redundant descriptions may be omitted. Output voltages may be output from the connection nodes CN2 to CNn of the first resistive element R1 and the second resistive element R2 provided in each of other PUF cells CL2 to CLn. However, the degree of mismatch of the first resistive element R1 and the second resistive element R2 of each of the plurality of PUF cells CL1 to CLn may be determined randomly, and accordingly, the output voltages of the plurality of PUF cells CL1 to CLn may vary.

The cell selection circuit 1221 may include a plurality of cell selection switches SSW1 to SSWn connected to each of the plurality of PUF cells CL1 to CLn, and a cell selector 1221a. The cell selector 1221a may control turn-on and turn-off operation of the plurality of cell selection switches SSW1 to SSWn. For example, the cell selector 1221a may generate on-off control signals corresponding to each of the plurality of cell selection switches SSW1 to SSWn, and provide the generated signals to each of the cell selection switches SSW1 to SSWn. The cell selector 1221a may turn on one of the plurality of cell selection switches SSW1 to SSWn and turn off other cell selection switches.

In some example embodiments, the cell selector 1221a may sequentially turn on the plurality of cell selection switches SSW1 to SSWn according to a clock signal. Accordingly, output voltages of the plurality of PUF cells CL1 to CLn may be sequentially output. In some example embodiments, the cell selector 1221a may sequentially turn on some cell selection switches selected based on the PUF control signal CTRL_PUF provided from the control logic circuit 130, among the plurality of cell selection switches SSW1 to SSWn. The output voltages of selected PUF cells among the plurality of PUF cells CL1 to CLn may be sequentially output.

The lower conductive line LM3b corresponding to the connection node CN may be connected to one end of the cell selection switch SSW through the lower contacts LMC1 to LMC3 and the lower conductive lines LM1a and LM2a. Another end of the cell selection switch SSW may be connected to the lower contacts LMC1 and LMC2 and the lower conductive lines LM1b and LM2b. When the cell selection switch SSW is turned on in response to an on-off control signal provided from the cell selector 1221a, the output voltage Vcell may be provided through the lower conductive line LM2b. At this time, the lower conductive line LM2b may be connected to an input terminal of a first comparator 1223a of the comparison circuit 1223.

The reference voltage generator 1222 (also herein referred to as a reference voltage generator circuit) may generate a first reference voltage Vref, a second reference voltage Vref_H, and a third reference voltage Vref_L by distributing the power voltage VDD using the third and fourth resistive elements R3 and R4. Here, the first reference voltage Vref may be a voltage for determining data values of the plurality of PUF cells CL1 to CLn, and the second and third reference voltages Vref_H and Vref_L may be voltages for determining the validity of data values of the plurality of PUF cells CL1 to CLn. At this time, the second reference voltage Vref_H may be higher than the first reference voltage Vref, and the third reference voltage Vref_L may be lower than the first reference voltage Vref.

In some example embodiments, the third and fourth resistive elements R3 and R4 may be implemented as resistive elements of the same type, and may be implemented as resistive elements of the same type as the first and second resistive elements R1 and R2, or resistive elements of different type than the first and second resistive elements R1 and R2. For example, each of the third resistive element R3 and the fourth resistive element R4 may include at least one through electrode. The third and fourth resistive elements R3 and R4 may be connected in series, and the power voltage VDD may be applied to one end of the third resistive element R3. Accordingly, the third and fourth resistive elements R3 and R4 may operate as a voltage divider. The first reference voltage Vref may be output from the connection node CNR of the third and fourth resistive elements R3 and R4.

In some example embodiments, a resistance value of the third resistive element R3 may be identical to a resistance value of the fourth resistive element R4. More specifically, a target resistance value of the third resistive element R3 may be identical to a target resistance value of the fourth resistive element R4. Accordingly, the first reference voltage Vref may be ½ times greater than the power voltage VDD. However, the mismatches that occur in the process of manufacturing semiconductors may generate differences in resistance values between the third resistive element R3 and the fourth resistive element R4, and such differences may turn up as errors in the first reference voltage Vref.

The comparison circuit 1223 may compare the output voltages of the respective PUF cells CL1 to CLn to the first to third reference voltages Vref, Vref_H, and Vref_L, and output the comparison result. The comparison circuit 1223 may compare the output voltage Vcell of the PUF cell, output from the cell selection circuit 1221 with the first to third reference voltages Vref, Vref_H, and Vref_L to sequentially output the comparison results for the plurality of PUF cells CL1 to CLn.

The comparison circuit 1223 may include the first comparator 1223a, a second comparator 1223b, and a third comparator 1223c. The first comparator 1223a may compare the output voltage Vcell of the PUF cell with the first reference voltage Vref, and output the comparison result (hereinafter, a "first comparison result.") For example, when the output voltage Vcell of the PUF cell is equal to or greater than the first reference voltage Vref, "1" may be output, and when the output voltage Vcell of the PUF cell is less than the first reference voltage Vref, "0" may be output. However, the inventive concepts are not limited thereto, and the opposite result may be output. The comparison result may be output as a data value of the PUF cell.

The second comparator 1223b may compare the output voltage Vcell of the PUF cell with the second reference voltage Vref_H, and output the comparison result (hereinafter, a "second comparison result.") For example, when the output voltage Vcell of the PUF cell is equal to or greater than the second reference voltage Vref_H, "1" may be output, and when the output voltage Vcell of the PUF cell is less than the second reference voltage Vref_H, "0" may be output. The opposite result may be output.

The third comparator 1223c may compare the output voltage Vcell of the PUF cell with the third reference voltage Vref_L, and output the comparison result (hereinafter, a "third comparison result.") For example, when the output voltage Vcell of the PUF cell is equal to or greater than the third reference voltage Vref_L, "1" may be output, and when the output voltage Vcell of the PUF cell is less than the third reference voltage Vref_L, "0" may be output. The opposite result may be output.

The comparison circuit 1223 may provide the first to third comparison results for each of the plurality of PUF cells CL1 to CLn to the combinational logic 1224. FIG. 8 describes the comparison circuit 1223 as having three comparators, e.g., the first to third comparators 1223a, 1223b, and 1223c, but the inventive concepts are not limited thereto. The comparison circuit 1223 may include one or two comparators, and the one or two comparators may compare the output voltage Vcell of the PUF cell to the first to third reference voltages Vref, Vref_H, and Vref_L in a time-sharing manner.

The combinational logic 1224 may be implemented as a plurality of logic gates, and may generate PUF data PDT based on the first comparison result for each of the plurality of the PUF cells CL1 to CLn, e.g., data values of the plurality of PUF cells CL1 to CLn. In addition, the combinational logic 1224 may generate a validity signal representing the validity of the data values of the PUF cell, e.g., the stability (or validity) of the PUF cell based on at least two comparison results of the first to third comparison results of the PUF cell. The combinational logic 1224 may output the validity signals of the plurality of PUF cells CL1 to CLn as the validity data VDT.

The combinational logic 1224 may determine whether the output voltage Vcell of the PUF cell is in the dead zone based on at least two comparison results of the first to third comparison results. For example, the dead zone may be determined as a voltage region between the second reference voltage Vref_H and the third reference voltage Vref_L. At this time, a validity signal for the PUF cell of which output voltage Vcell is in the dead zone may be generated as "0," and a validity signal for the PUF cell of which output voltage Vcell is not in the dead zone may be generated as "1."

As described above, the PUF circuit 120 according to example embodiments of the inventive concepts may generate the PUF data PDT through comparing a first reference voltage Vref to the output voltages of the plurality of PUF cells CL1 to CLn, generated by distribution of the power voltage VDD, by using the resistive elements. At this time, as the resistive elements used for the power voltage VDD distribution have the same variation characteristics according to changes in temperature, voltage, test conditions, etc. and environmental changes, such as deterioration, etc., the output voltages of the plurality of PUF cells CL1 to CLn and the first reference voltage Vref may remain relatively constant regardless of the environmental changes. Accordingly, the number of unstable PUF cells may be small.

In addition, the PUF circuit 120 may generate the second reference voltage Vref_H and the third reference voltage Vref_L, and set the dead zone based thereon to screen unstable PUF cells and select stable PUF cells (or valid data values.) By screening unstable PUF cells which are highly likely to generate potentially unstable data values, and using data values of strong PUF cells having sufficient margins, a bit error rate (BER) of the PUF circuit 120 may be reduced. For example, when the difference among the first reference voltage Vref, the second reference voltage Vref_H, and the third reference voltage Vref_L, e.g., the margin is set widely, and the PUF circuit 120 may achieve the zero BER.

Figure 10:
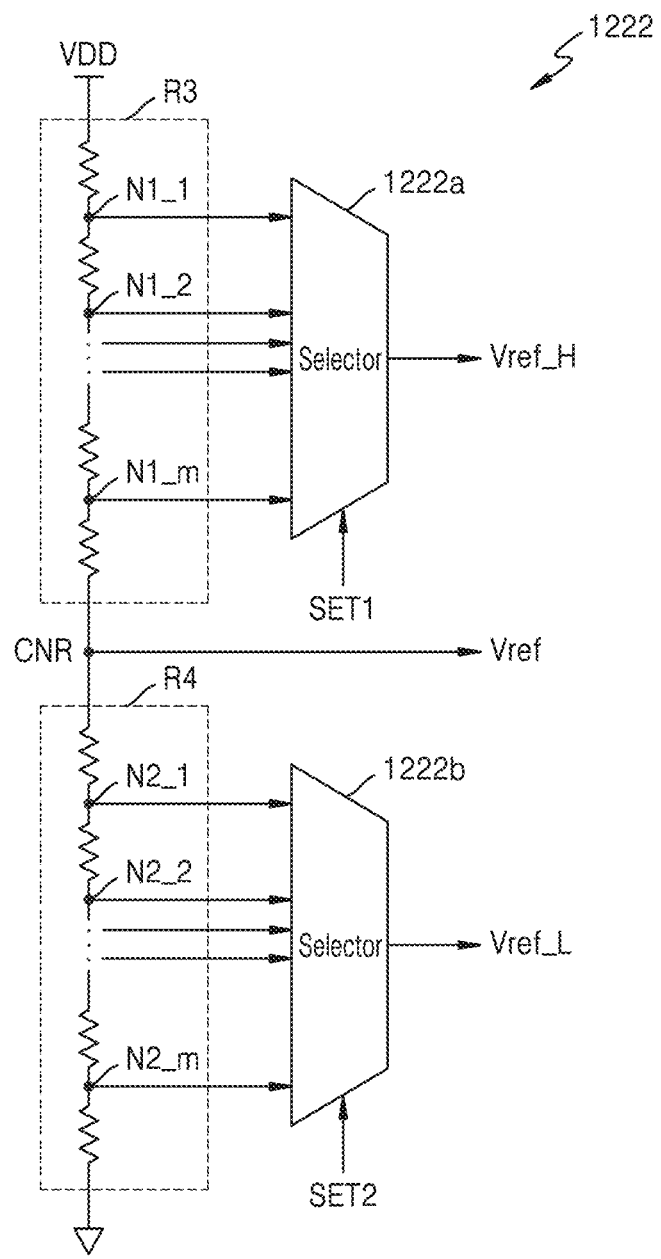
FIG. 10 is a circuit diagram of a reference voltage generator according to some example embodiments.

FIG. 10 is a circuit diagram of a reference voltage generator 1222 according to some example embodiments.

With reference to FIG. 10, the reference voltage generator 1222 may include the third resistive element R3, the fourth resistive element R4, a first selector 1222a, and a second selector 1222b. Each of the third resistive element R3 and the fourth resistive element R4 may be implemented as a resistive string including a plurality of resistors. The third resistive element R3 and the fourth resistive element R4 may distribute the power voltage VDD and output the divided voltages. The voltage of the connection node CNR of the third resistive element R3 and the fourth resistive element R4 may be output as the first reference voltage Vref. A resistance value, e.g., a target resistance value of the third resistive element R3 may be identical to a target resistance value of the fourth resistive element R4, and the first reference voltage Vref may be approximately ½ greater than the power voltage VDD.

A plurality of divided voltages may be output from the third resistive element R3, e.g., a plurality of nodes N1_1 to N1_m of the resistive string, and the first selector 1222a may select one of the plurality of divided voltages as the second reference voltage Vref_H based on a first set signal SET1. A plurality of divided voltages may be output from the fourth resistive element R4, e.g., a plurality of nodes N2_1 to N2_m of the resistive string, and the second selector 1222b may select one of the plurality of divided voltages as the third reference voltage Vref_L based on a second set signal SET2.

The first set signal SET1 and the second set signal SET2 may be included in the PUF control signal CTRL_PUF provided from the control logic circuit (130 of FIG. 2) and may be variable. The first set signal SET1 and the second set signal SET2 may be set in consideration of dispersion of the first reference voltage Vref, offset, noise, etc. of the comparators (1223a, 1223b, and 1223c of FIG. 8.) For example, when the dispersion of the first reference voltage Vref is great, the first set signal SET1 may be set to select a divided voltage of higher level, and the second set signal SET2 may be set to select a divided voltage of lower level.

Figure 11:
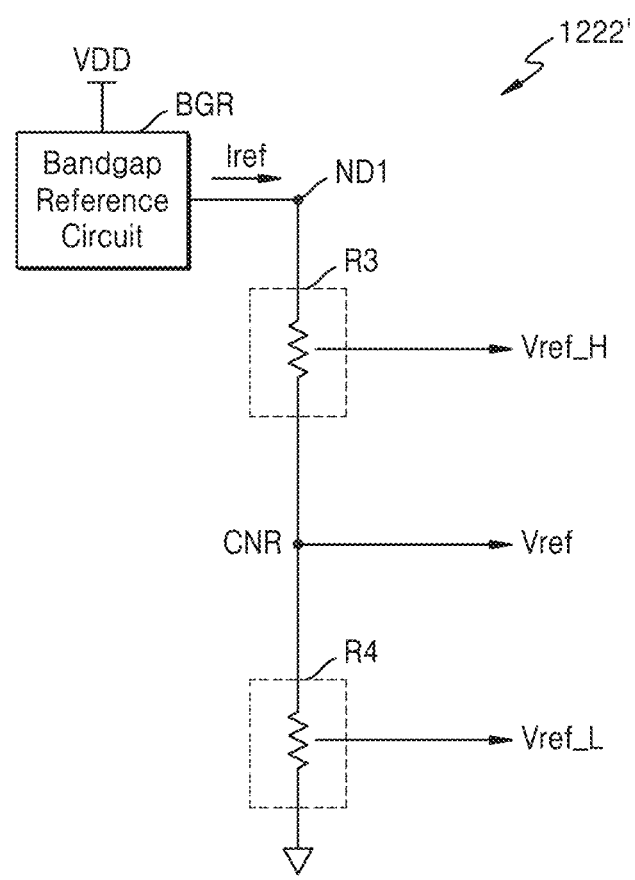
FIG. 11 is a circuit diagram of a reference voltage generator according to some example embodiments.

FIG. 11 is a circuit diagram of a reference voltage generator 1222' according to some example embodiments.

With reference to FIG. 11, the reference voltage generator 1222' is an implementation example of the reference voltage generator 1222 described with reference to FIG. 8, and therefore, descriptions on the reference voltage generator 1222 of FIG. 8 may be applied to the reference voltage generator 1222' according to these example embodiments. The reference voltage generator 1222' may include a bandgap reference circuit BGR, the third resistive element R3, and the fourth resistive element R4.

The bandgap reference circuit BGR may output a reference current Iref of constant level regardless of changes in temperature, voltage, etc. The reference current Iref may flow through the third resistive element R3 and the fourth resistive element R4, and a current amount of the reference current Iref may be set to allow one end ND1 of the third resistive element R3 to reach a level of the power voltage VDD. As generation of the third resistive element R3, the fourth resistive element R4, and the first to third reference voltages Vref, Vref_H, and Vref_L may be as described above with reference to FIGS. 8 and 10, redundant explanations thereon will be omitted.

Figure 12:
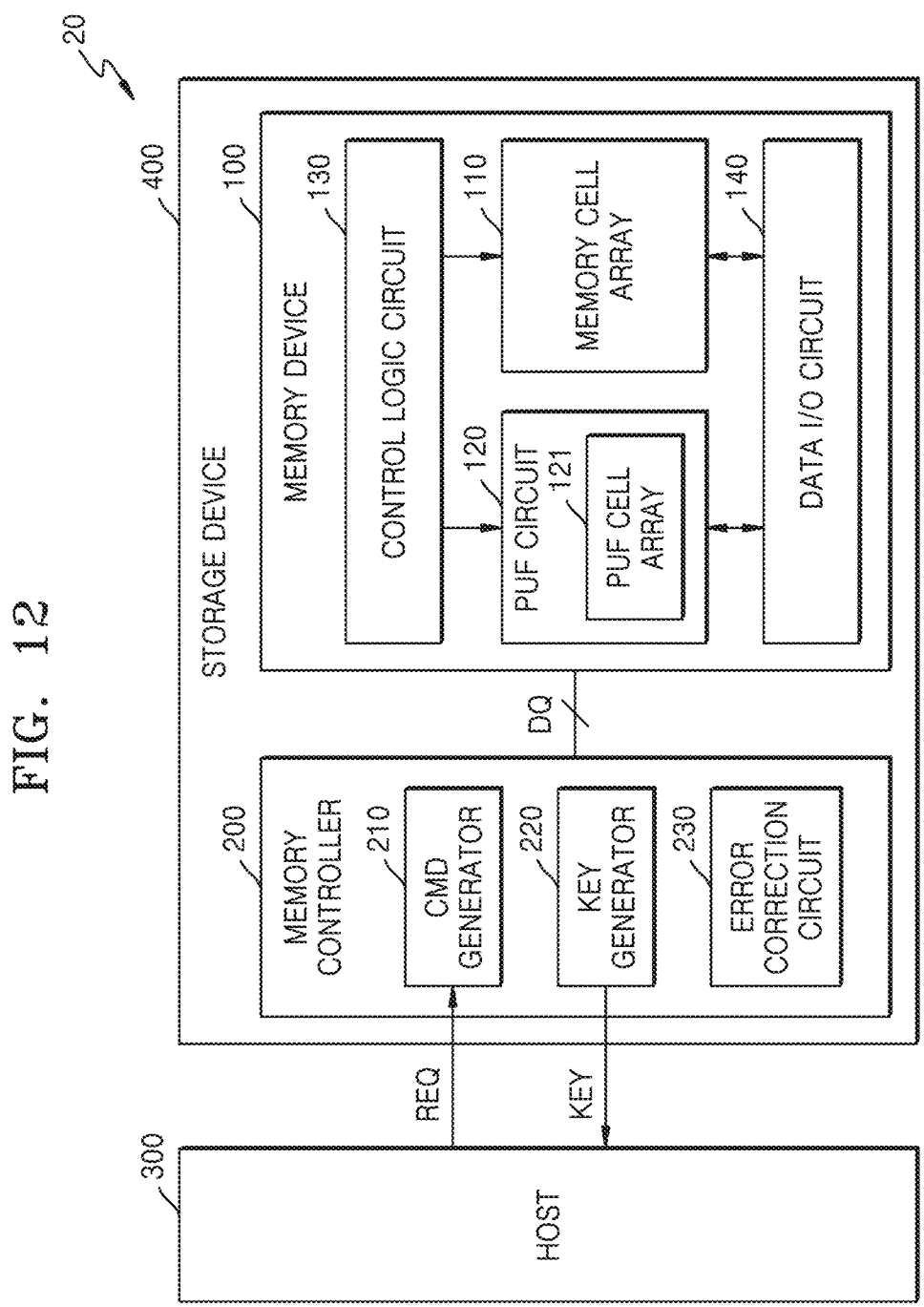
FIG. 12 is a block diagram of a storage system according to some example embodiments.

FIG. 12 is a block diagram of a storage system 20 according to some example embodiments.

With reference to FIG. 12, the storage system 20 may include a host 300 and a storage device 400, and the storage device 400 may include the memory device 100 and the memory controller 200. For example, the storage device 400 may correspond to the memory system 10 of FIG. 1, and may be referred to as a "security device." Accordingly, the descriptions made with reference to FIGS. 1 to 11 may be applied to this example embodiment as well.

The host 300 may transmit an authentication request REQ to the storage device 400. The authentication request REQ may correspond to a device authentication request. The storage device 400 may generate an authentication key KEY in response to the authentication request REQ, and provide the generated authentication key KEY to the host 300. The host 300 may confirm the received authentication key KEY to authenticate the storage device 400.

The memory controller 200 may include a command generator 210, a key generator 220, and an error correction circuit 230. The memory device 100 may include the memory cell array 110, the PUF circuit 120, the control logic circuit 130, and the data input/output circuit 140. The memory device 100 and the memory controller 200 may be electrically connected to each other through a plurality of input/output signal lines or a plurality of data signal lines DQ. For example, the command CMD, the address ADDR, and the data DATA of FIG. 1 may be transmitted through the plurality of data signal lines DQ. As for the configuration of the memory device 100, descriptions made with reference to FIGS. 1 to 11 may be applied thereto, and thus, redundant explanations will be omitted.

The command generator 210 may generate a command CMD for requesting the PUF data in response to the authentication request REQ received from the host 300. For example, the command CMD requesting the PUF data may be transmitted to the memory device 100 through the plurality of data signal lines DQ. Further, the command generator 210 may generate an address ADDR for indicating the PUF cell array 121 in response to the authentication request REQ received from the host 300. For example, the address ADDR may be transmitted to the memory device 100 through the plurality of data signal lines DQ.

The key generator 220 may receive data including the PUF data (e.g., PDT of FIG. 2) and the validity data (e.g., VDT of FIG. 2) from the memory device 100, and generate the authentication key KEY based on the received PUF data and the validity data. Specifically, the key generator 220 may determine whether the PUF data is valid based on the validity data, and generate the authentication key KEY using only valid PUF data. For example, the PUF data and the validity data may be transmitted to the memory controller 200 through the plurality of data signal lines DQ.

The error correction circuit 230 may perform error correction with respect to the authentication key KEY. In some example embodiments, the error correction circuit 230 may perform error correction with respect to the authentication key KEY by using an error correction code ECC. The error correction code may include at least one of coded modulation including a low density parity check (LDPC) code, a Bose, Chaudhuri, Hocquenghem (BCH) code, a turbo code, a Reed-Solomon code, a convolution code, a recursive systematic code (RSC), a trellis-coded modulation (TCM), a block coded modulation (BCM), a majority voting, etc. However, the inventive concepts are not limited thereto, and in some example embodiments, the error correction circuit 230 may be included in the memory device 100, and perform error correction on the PUF data. At this time, the data input/output circuit 140 may transmit the error-corrected PUF data to the memory controller 200.

Figure 13:
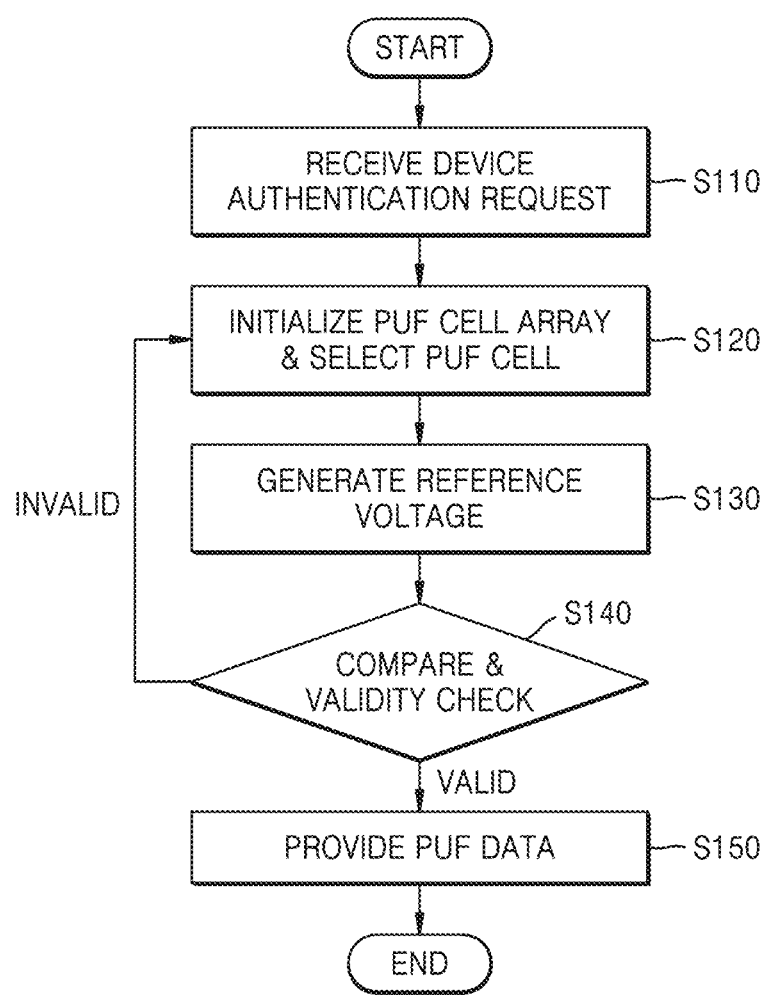
FIG. 13 is a flowchart of an operating method of a memory device according to some example embodiments.

FIG. 13 is a flowchart of an operating method of a memory device according to some example embodiments. With reference to FIG. 13, the operating method of the memory device may be a method of generating the PUF data by the memory device, and may be performed, for example, in the memory device 100 of FIG. 1. The descriptions made with reference to FIGS. 1 to 12 may be applied to this example embodiment, and thus, redundant explanations will be omitted.

In operation S110, the memory device 100 may receive a device authentication request. For example, the memory device 100 may receive a command CMD, an address ADDR, and/or a control signal CTRL corresponding to the device authentication request from a memory controller 200. In operation S120, the memory device 100 may initialize the PUF cell array 121 and select the PUF cell. For example, the control logic circuit 130 may initialize the PUF cell array 121 by controlling the voltage generator 150 to provide the power voltage VDD to the PUF cell array 121. For example, the control logic circuit 130 may enable the cell selection circuit 1221 and provide on-off control signals corresponding to the plurality of cell selection switches SSW1 to SSWn.

In operation S130, the memory device 100 may generate a reference voltage. For example, the reference voltage generator 1222 may generate the first to third reference voltages Vref, Vref_H, and Vref_L by distributing the power voltage VDD. In operation S140, the PUF data PDT may be generated by comparing the output voltage Vcell of the PUF cell to the reference voltage Vref, and the validity of the generated PUF data PDT may be checked. For example, the combinational logic 1224 may generate the PUF data PDT and the validity data VDT based on the output voltage Vcell of the PUF cell and the first to third reference voltages Vref, Vref_H, and Vref_L. When the generated PUF data PDT is valid, operation S150 is performed, and otherwise, the operation S120 is performed. In operation S150, the memory device 100 may provide the PUF data PDT. For example, the data input/output circuit 140 may provide the data DATA including the PUF data PDT to the memory controller 200.

Figure 14:
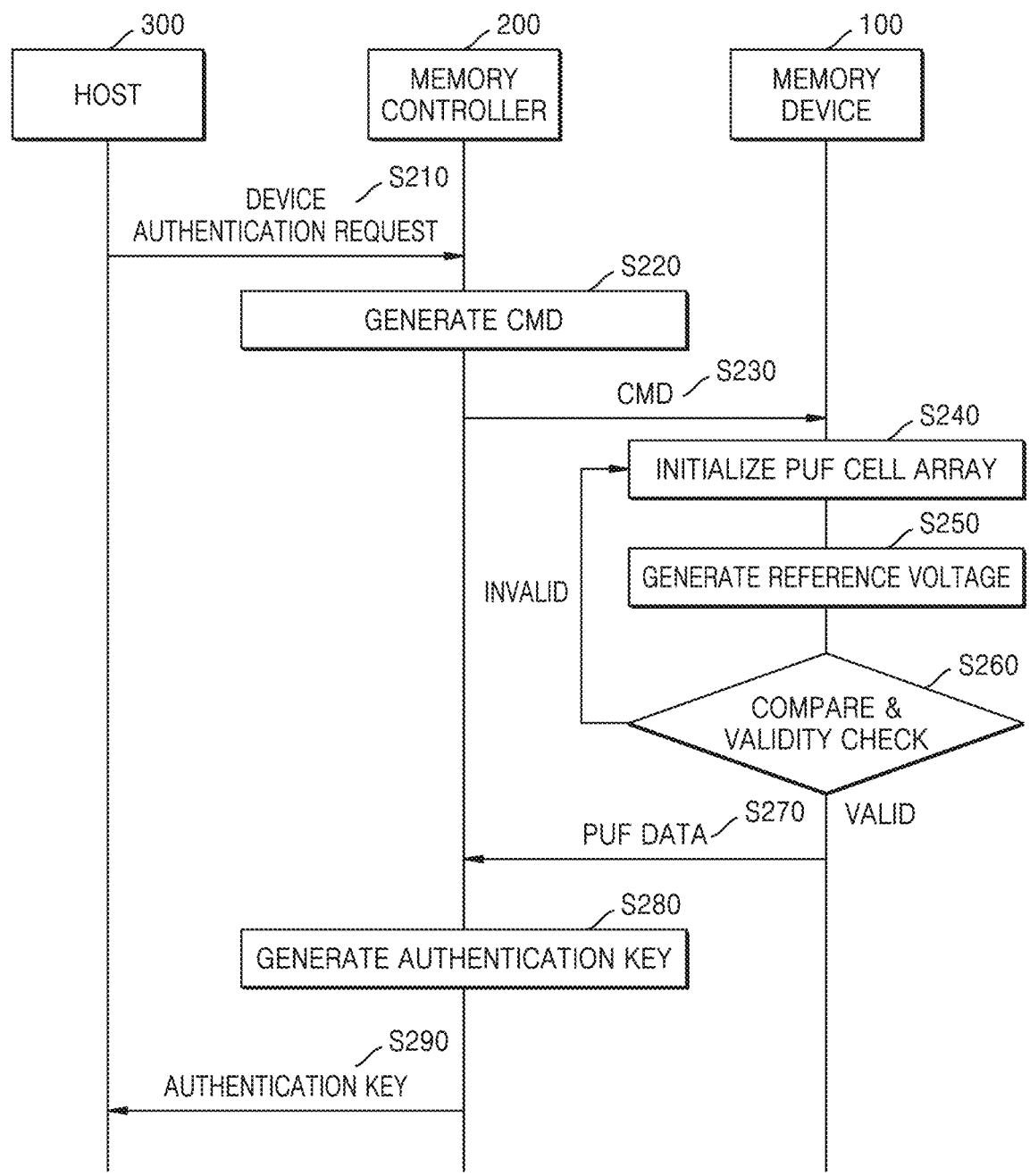
FIG. 14 is a flowchart of an operating method with respect to a host, a memory controller, and a memory device according to some example embodiments.

FIG. 14 is a flowchart of an operating method among a host 300, a memory controller 200, and a memory device 100 according to some example embodiments. With reference to FIG. 14, the operating method according to the example embodiments may include operations performed time-sequentially among the host 300, the memory controller 200, and the memory device 100 of FIG. 12.

In operation S210, the host 300 may transmit a device authentication request. In operation S220, the memory controller 200 may generate a command in response to the device authentication request. In operation S230, the memory controller 200 may transmit the generated command to the memory device 100. In operation S240, the memory device 100 may initialize the PUF cell array. In operation S250, the memory device 100 may generate a reference voltage. In operation S260, the memory device 100 may compare the output voltage of the PUF cell to the reference voltage to generate the PUF data, and check the validity of the generated PUF data. In operation S270, the memory device 100 may transmit the PUF data to the memory controller 200. In operation S280, the memory controller 200 may generate an authentication key based on the PUF data. In operation S290, the memory controller 200 may transmit the authentication key to the host 300.

Figure 15:
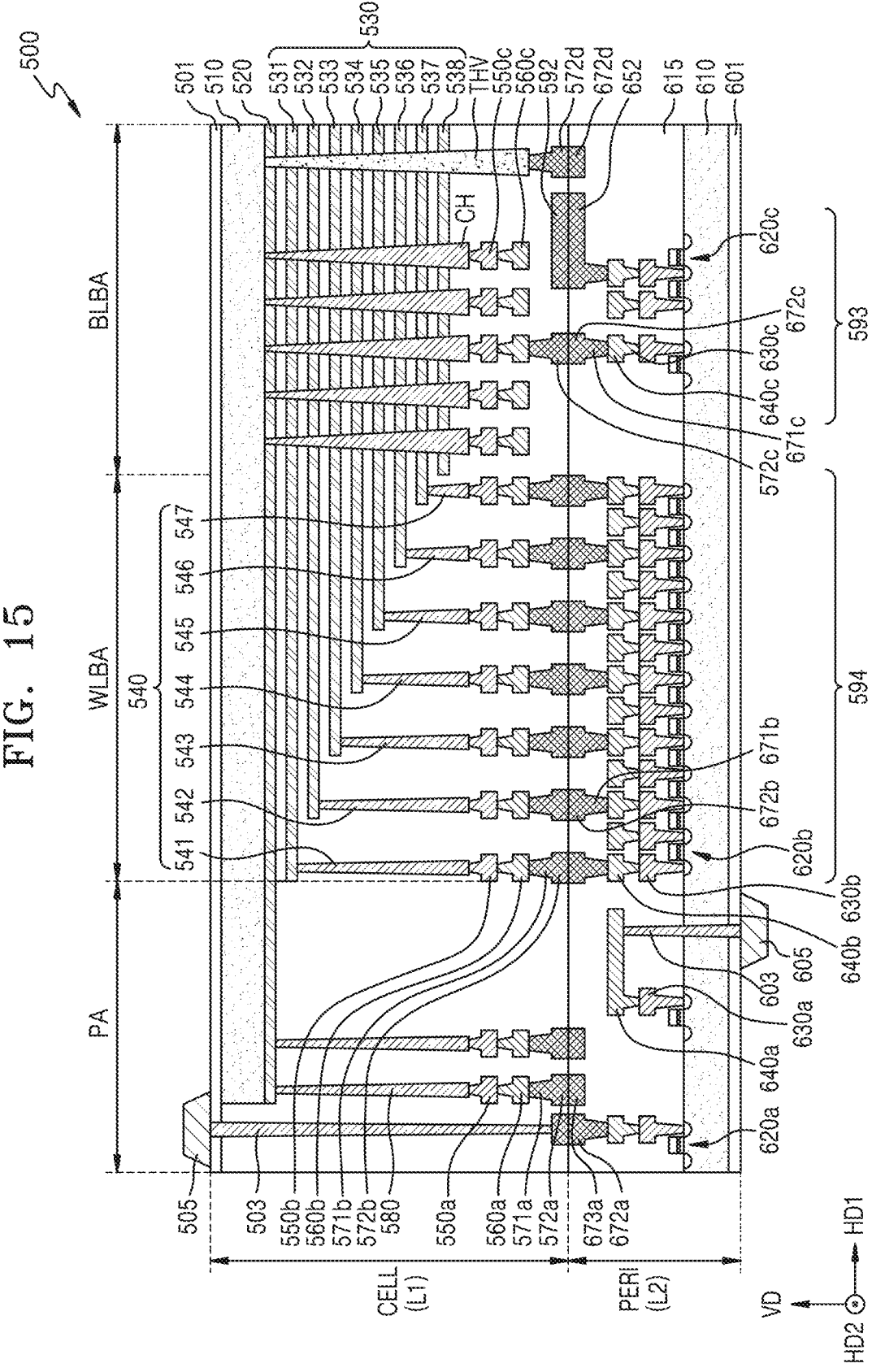
FIG. 15 is a cross-sectional diagram of a memory device having a bonding vertical NAND (B-VNAND) structure according to some example embodiments.

FIG. 15 is a cross-sectional diagram of a memory device 500 having a bonding vertical NAND (B-VNAND) structure according to some example embodiments. When a nonvolatile memory included in the memory device is implemented as a B-VNAND type flash memory, the nonvolatile memory may have the structure shown in FIG. 15.

With reference to FIG. 15, the cell region CELL of the memory device 500 may correspond to the first semiconductor layer L1, and the peripheral circuit region PERI may correspond to the second semiconductor layer L2. The peripheral circuit region PERI of the memory device 500 and the cell region CELL may include an external pad bonding area PA, a word line bonding area WLBA, and a bit line bonding area BLBA.

The peripheral circuit region PERI may include a first substrate 610, an interlayer insulating layer 615, a plurality of circuit elements 620*a*, 620*b*, and 620*c* formed on the first substrate 610, first metal layers 630*a*, 630*b*, and 630*c* respectively connected to the plurality of circuit elements 620*a*, 620*b*, and 620*c*, and second metal layers 640*a*, 640*b*, and 640*c* formed on the first metal layers 630*a*, 630*b*, and 630*c*. In some example embodiments, the first metal layers 630*a*, 630*b*, and 630*c* may be formed of tungsten or another material having relatively high resistivity, and the second metal layers 640*a*, 640*b*, and 640*c* may be formed of copper, or another material having relatively low resistivity.

In some example embodiments, although only the first metal layers 630*a*, 630*b*, and 630*c* and the second metal layers 640*a*, 640*b*, and 640*c* are shown and described the example embodiments are not limited thereto, and one or more additional metal layers may be further formed on the second metal layers 640*a*, 640*b*, and 640*c*. At least a portion of the one or more additional metal layers formed on the second metal layers 640*a*, 640*b*, and 640*c* may be formed of aluminum or the like having a lower resistivity than those of copper forming the second metal layers 640*a*, 640*b*, and 640*c*.

The interlayer insulating layer 615 may be disposed on the first substrate 610 and cover the plurality of circuit elements 620*a*, 620*b*, and 620*c*, the first metal layers 630*a*, 630*b*, and 630*c*, and the second metal layers 640*a*, 640*b*, and 640*c*. The interlayer insulating layer 615 may include an insulating material such as silicon oxide, silicon nitride, or the like.

Lower bonding metals 671*b* and 672*b* may be formed on the second metal layer 640*b* in the word line bonding area WLBA. In the word line bonding area WLBA, the lower bonding metals 671*b* and 672*b* in the peripheral circuit region PERI may be electrically bonded to upper bonding metals 571*b* and 572*b* of the cell region CELL. The lower bonding metals 671*b* and 672*b* and the upper bonding metals 571*b* and 572*b* may be formed of aluminum, copper, tungsten, or the like. Further, the upper bonding metals 571*b* and 572*b* in the cell region CELL may be referred as first metal pads and the lower bonding metals 671*b* and 672*b* in the peripheral circuit region PERI may be referred as second metal pads. The first and second metal pads may be bonded to each other.

The cell region CELL may include at least one memory block. The cell region CELL may include a second substrate 510 and a common source line 520. On the second substrate 510, a plurality of word lines 531 to 538 (e.g., 530) may be stacked in a direction (a vertical direction VD), perpendicular to an upper surface of the second substrate 510. At least one string select line and at least one ground select line may be arranged on and below the plurality of word lines 530, respectively, and the plurality of word lines 530 may be disposed between the at least one string select line and the at least one ground select line.

In the bit line bonding area BLBA, a channel structure CH may extend in a direction (a vertical direction VD), perpendicular to the upper surface of the second substrate 510, and pass through the plurality of word lines 530, the at least one string select line, and the at least one ground select line. The channel structure CH may include a data storage layer, a channel layer, a buried insulating layer, and the like, and the channel layer may be electrically connected to a first metal layer 550*c* and a second metal layer 560*c*. For example, the first metal layer 550*c* may be a bit line contact, and the second metal layer 560*c* may be a bit line. In some example embodiments, the bit line 560*c* may extend in a second horizontal direction HD2, parallel to the upper surface of the second substrate 510.

In some example embodiments, an area in which the channel structure CH, the bit line 560*c*, and the like are disposed may be defined as the bit line bonding area BLBA. In the bit line bonding area BLBA, the bit line 560*c* may be electrically connected to the circuit elements 620*c* providing a page buffer 593 in the peripheral circuit region PERI. The bit line 560*c* may be connected to upper bonding metals 571*c* and 572*c* in the cell region CELL, and the upper bonding metals 571*c* and 572*c* may be connected to lower bonding metals 671*c* and 672*c* connected to the circuit elements 620*c* of the page buffer 593.

In some example embodiments, the memory device 500 may further include a through electrode THV arranged in the bit line bonding area BLBA. The through electrode THV may extend in the vertical direction VD passing through the word lines 530. The through electrode THV may constitute the PUF cell array. The through electrode THV may be connected to the upper bonding metal 572*d* and the lower bonding metal 672*d* and may be connected to the PUF controller arranged in the peripheral circuit PERI.

In the word line bonding area WLBA, the plurality of word lines 530 may extend in a first horizontal direction HD1, parallel to the upper surface of the second substrate 510, and may be connected to a plurality of cell contact plugs 541 to 547 (e.g., 540). The plurality of word lines 530 and the plurality of cell contact plugs 540 may be connected to each other in pads provided by at least a portion of the plurality of word lines 530 extending in different lengths in the second horizontal direction. A first metal layer 550*b* and a second metal layer 560*b* may be connected to an upper portion of the plurality of cell contact plugs 540 connected to the plurality of word lines 530, sequentially. The plurality of cell contact plugs 540 may be connected to the peripheral circuit region PERI by the upper bonding metals 571*b* and 572*b* of the cell region CELL and the lower bonding metals 671*b* and 672*b* of the peripheral circuit region PERI in the word line bonding area WLBA.

The plurality of cell contact plugs 540 may be electrically connected to the circuit elements 620*b* providing a row decoder 594 in the peripheral circuit region PERI. In some example embodiments, operating voltages of the circuit elements 620*b* of the row decoder 594 may be different than operating voltages of the circuit elements 620*c* providing the page buffer 593. For example, operating voltages of the circuit elements 620*c* providing the page buffer 593 may be greater than operating voltages of the circuit elements 620*b* providing the row decoder 594.

In some example embodiments, at least one of the cell contact plugs 540 may constitute the PUF cell array. At least one of the cell contact plugs 540 may be connected to the upper bonding metal 571*b* and 572*b* and the lower bonding metal 671*b* and 672*b*, and may be connected to the PUF controller arranged in the peripheral circuit region PERI. In some example embodiments, the memory device 500 may further include a through electrode arranged in the word line bonding area WLBA, and the through electrode may constitute the PUF cell array although it is not shown in the drawings. The through electrode may be connected to the upper bonding metal 571*b* and 572*b* and the lower bonding metal 671*b* and 672*b*, and may be connected to the PUF controller arranged in the peripheral circuit region PERI.

A common source line contact plug 580 may be disposed in the external pad bonding area PA. The common source line contact plug 580 may be formed of a conductive material such as a metal, a metal compound, polysilicon, or the like, and may be electrically connected to the common source line 520. A first metal layer 550*a* and a second metal layer 560*a* may be stacked on an upper portion of the common source line contact plug 580, sequentially. For example, an area in which the common source line contact plug 580, the first metal layer 550*a*, and the second metal layer 560*a* are disposed may be defined as the external pad bonding area PA.

Input-output pads 605 and 505 may be disposed in the external pad bonding area PA. A lower insulating film 601 covering a lower surface of the first substrate 610 may be formed below the first substrate 610, and a first input-output pad 605 may be formed on the lower insulating film 601. The first input-output pad 605 may be connected to at least one of the plurality of circuit elements 620*a*, 620*b*, and 620*c* disposed in the peripheral circuit region PERI through a first input-output contact plug 603, and may be separated from the first substrate 610 by the lower insulating film 601. In addition, a side insulating film may be disposed between the first input-output contact plug 603 and the first substrate 610 to electrically separate the first input-output contact plug 603 and the first substrate 610.

In some example embodiments, the memory device 500 may further include a through electrode arranged in the external pad bonding area PA, and the through electrode may constitute the PUF cell array although it is not shown in the drawings. The through electrode may be connected to the upper bonding metal 571*a* and 572*a* and the lower bonding metal 673*a*, and may be connected to the PUF controller arranged in the peripheral circuit region PERI.

An upper insulating film 501 covering the upper surface of the second substrate 510 may be formed on the second substrate 510, and a second input-output pad 505 may be disposed on the upper insulating film 501. The second input-output pad 505 may be connected to at least one of the plurality of circuit elements 620*a*, 620*b*, and 620*c* disposed in the peripheral circuit region PERI through a second input-output contact plug 503.

According to example embodiments, the second substrate 510 and the common source line 520 may not be disposed in an area in which the second input-output contact plug 503 is disposed. Also, the second input-output pad 505 may not overlap the word lines 530 in the vertical direction (the vertical direction VD). The second input-output contact plug 503 may be separated from the second substrate 510 in a direction, parallel to the upper surface of the second substrate 510, and may pass through an interlayer insulating layer of the cell region CELL to be connected to the second input-output pad 505.

According to example embodiments, the first input-output pad 605 and the second input-output pad 505 may be selectively formed. For example, the memory device 500 may include only the first input-output pad 605 disposed on the first substrate 610 or the second input-output pad 505 disposed on the second substrate 510. Alternatively, the memory device 500 may include both the first input-output pad 605 and the second input-output pad 505.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 500 may include a lower bonding metal pattern 673*a*, corresponding to an upper bonding metal pattern 572*a* formed in an uppermost metal layer of the cell region CELL, and having the same cross-sectional shape as the upper bonding metal pattern 572*a* of the cell region CELL so as to be connected to each other, in an uppermost metal layer of the peripheral circuit region PERI. In the peripheral circuit region PERI, the lower bonding metal pattern 673*a* formed in the uppermost metal layer of the peripheral circuit region PERI may not be connected to a contact. Similarly, in the external pad bonding area PA, an upper metal pattern, corresponding to the lower metal pattern formed in an uppermost metal layer of the peripheral circuit region PERI, and having the same shape as a lower metal pattern of the peripheral circuit region PERI, may be formed in an uppermost metal layer of the cell region CELL.

The lower bonding metals 671*b* and 672*b* may be formed on the second metal layer 640*b* in the word line bonding area WLBA. In the word line bonding area WLBA, the lower bonding metals 671*b* and 672*b* of the peripheral circuit region PERI may be electrically connected to the upper bonding metals 571b and 572b of the cell region CELL by a Cu-to-Cu bonding, although other bonding metals may be used.

Further, in the bit line bonding area BLBA, an upper metal pattern 592, corresponding to a lower metal pattern 652 formed in the uppermost metal layer of the peripheral circuit region PERI, and having the same cross-sectional shape as the lower metal pattern 652, may be formed in an uppermost metal layer of the cell region CELL. A contact may not be formed on the upper metal pattern 592 formed in the uppermost metal layer of the cell region CELL.

Figure 16:
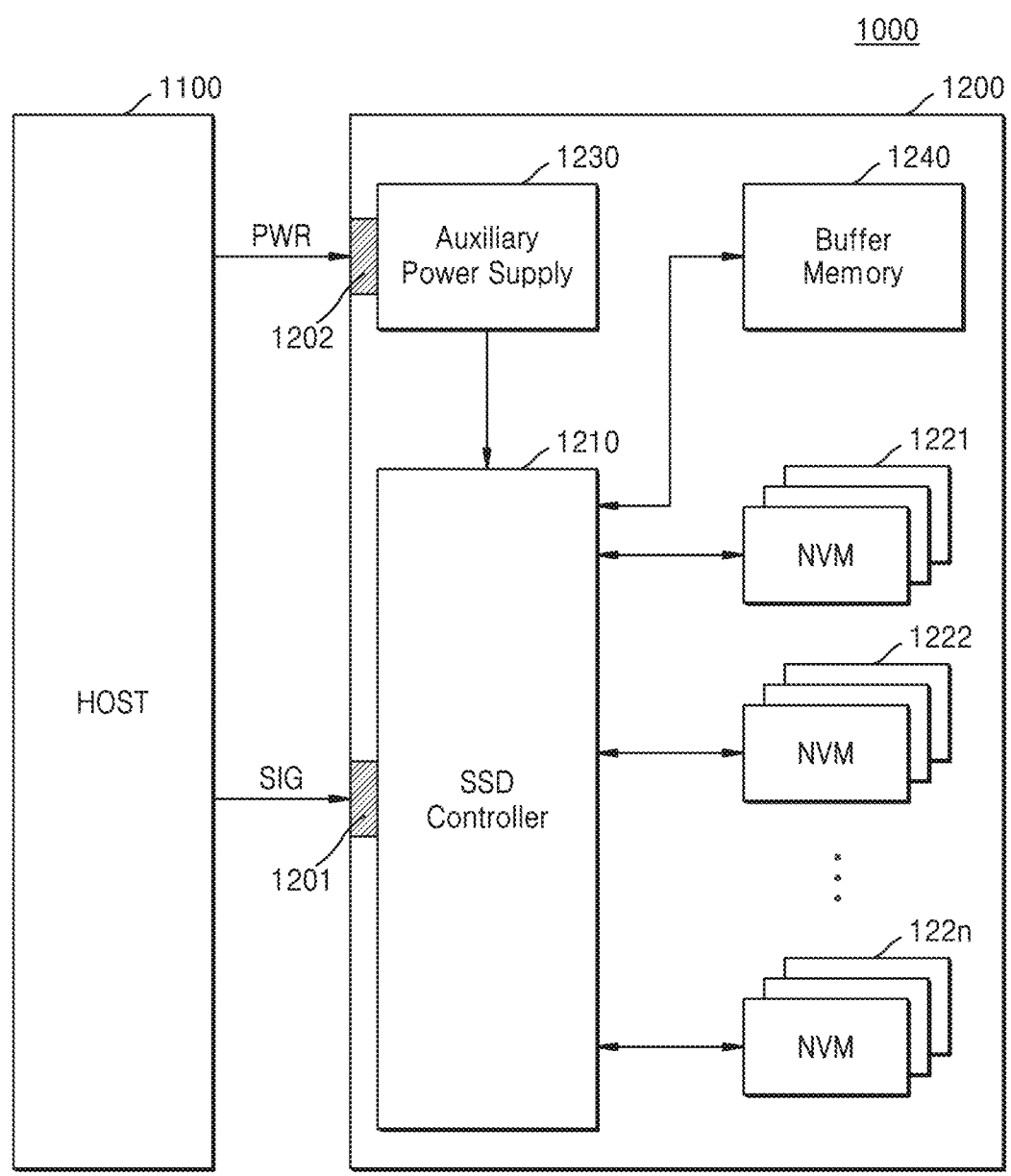
FIG. 16 is a block diagram of a solid-state drive (SSD) system employing a memory device according to some example embodiments.

FIG. 16 is a block diagram of an SSD system employing a memory device according to some example embodiments. With reference to FIG. 16, the SSD system 1000 may include a host 1100 and an SSD 1200. The SSD 1200 may send and receive signals with the host 1100, and may be provided with power from a power connector. The SSD 1200 may include an SSD controller 1210, an auxiliary power device 1220, and memory devices 1230, 1240, and 1250. The memory devices 1230, 1240, and 1250 may be a vertically stacked NAND flash memory device. The SSD 1200 may be implemented by using the embodiments described with reference to FIGS. 1 to 15.

As described above, the memory device may implement a PUF circuit by using a plurality of through electrodes extending in the vertical direction. However, the technical features of the inventive concepts are not limited to the memory device. In some example embodiments, an integrated circuit may include through electrodes having certain height, and a PUF circuit may be implemented by using the through electrodes. The through electrodes included in the integrated circuit may be used as a voltage divider to generate PUF data, and an authentication key may also be generated based on the PUF data.

While the inventive concepts have been particularly shown and described with reference to example embodiments thereof, it will be understood that various changes in form and details may be made therein without departing from the spirit and scope of the following claims.

What is claimed is:

1. A memory device comprising:
a memory cell array in a first semiconductor layer and including word lines stacked in a first direction, and channel structures passing through the word lines in the first direction;
a control logic circuit in a second semiconductor layer located below the first semiconductor layer in the first direction; and
a physical unclonable function (PUF) circuit including a plurality of through electrodes passing through the first semiconductor layer and the second semiconductor layer in the first direction, and configured to
generate PUF data according to resistance values of the plurality of through electrodes, and
generate the PUF data based on a node voltage between through electrodes connected in series, from among the plurality of through electrodes.

2. The memory device of claim 1, wherein
the first semiconductor layer is divided into a cell region in which the channel structures are arranged, a word line step region, and a peripheral region;
the plurality of through electrodes include at least one of
a first through electrode formed in the cell region;
a second through electrode formed in the word line step region; and
a third through electrode formed in the peripheral region.

3. The memory device of claim 2, wherein the first through electrode, the second through electrode, and the third through electrode have different resistance values.

4. The memory device of claim 1, wherein the PUF circuit includes
a PUF cell array configured to generate an output voltage by distributing a power supply voltage using the plurality of through electrodes, the PUF cell array includes a plurality of PUF cells;
a reference voltage generator circuit configured to generate a first reference voltage by distributing the power supply voltage; and
a comparison circuit configured to generate the PUF data by comparing the output voltage with the first reference voltage.

5. The memory device of claim 4, wherein each of the plurality of PUF cells includes
a first resistive element including a through electrode between a power supply voltage terminal to which the power supply voltage is applied and a first node; and
a second resistive element including a through electrode between the first node and a ground voltage terminal to which a ground voltage is applied, a voltage of the first node is supplied to the comparison circuit as the node voltage.

6. The memory device of claim 4, wherein each of the plurality of PUF cells includes
a first resistive element including a plurality of through electrodes connected in series between a power supply voltage terminal to which the power supply voltage is applied and a first node, and
a second resistive element including a plurality of through electrodes connected in series between the first node and a ground voltage terminal to which a ground voltage is applied, and wherein a voltage of the first node is supplied to the comparison circuit as the node voltage.

7. The memory device of claim 4, wherein the reference voltage generator circuit includes
a first resistive element between a power supply voltage terminal to which the power supply voltage is applied and a first node; and
a second resistive element between the first node and a ground voltage terminal to which a ground voltage is applied, and
wherein a voltage of the first node is supplied to the comparison circuit as the first reference voltage.

8. The memory device of claim 7, wherein each of the first resistive element and the second resistive element includes at least one through electrode.

9. The memory device of claim 7, wherein the reference voltage generator circuit is configured to generate a second reference voltage greater than the first reference voltage, and a third reference voltage less than the first reference voltage, and
the comparison circuit is configured to further compare an output voltage of each of the plurality of PUF cells with at least one of the second reference voltage and the third reference voltage.

10. The memory device of claim 9, wherein the PUF circuit further includes a combinational logic configured to generate validity data representing validity of each of the plurality of PUF cells based on a result of a comparison between the output voltage of each of the plurality of PUF cells and at least one of the second reference voltage and the third reference voltage.

11. The memory device of claim 1, wherein the plurality of through electrodes are arranged in a peripheral region of the first semiconductor layer, and include first through electrodes passing through an upper insulating layer in the first direction.

12. A memory device comprising:
a memory cell region including word lines stacked in a first direction, channel structures passing through the word lines in the first direction, and a first metal pad;
a peripheral circuit region including a second metal pad and connected to the memory cell region in the first direction by the first metal pad and the second metal pad; and
a physical unclonable function (PUF) circuit including a plurality of through electrodes passing through the memory cell region in the first direction, and configured to
generate PUF data according to resistance values of the plurality of through electrodes, and
generate the PUF data based on a node voltage between through electrodes connected in series, from among the plurality of through electrodes.

13. The memory device of claim 12, wherein the memory cell region is divided into a cell region in which the channel structures are arranged, a word line step region, and a peripheral region, and
wherein the plurality of through electrodes include
at least one of a first through electrode formed in the cell region;
a second through electrode formed in the word line step region; and
a third through electrode formed in the peripheral region.

14. The memory device of claim 12, wherein the PUF circuit includes
a PUF cell array configured to generate an output voltage by distributing a power supply voltage using the plurality of through electrodes;
a reference voltage generator circuit configured to generate a first reference voltage by distributing the power supply voltage; and
a comparison circuit configured to output the PUF data by comparing the output voltage with the first reference voltage.

15. The memory device of claim 14, wherein the PUF cell array includes a plurality of PUF cells, and each of the plurality of PUF cells includes
a first resistive element including at least one through electrode between a power supply voltage terminal to which the power supply voltage is applied and a first node; and
a second resistive element including at least one through electrode between the first node and a ground voltage terminal to which a ground voltage is applied, and wherein a voltage of the first node is supplied to the comparison circuit as the node voltage.

16. The memory device of claim 14, wherein the reference voltage generator circuit includes a first resistive element between a power supply voltage terminal to which the power supply voltage is applied and a first node; and
a second resistive element between the first node and a ground voltage terminal to which a ground voltage is applied, and
wherein a voltage of the first node is supplied to the comparison circuit as the first reference voltage.

17. The memory device of claim 12, wherein
the memory cell region is formed in a first wafer, and
the peripheral circuit region is formed in a second wafer.

18. The memory device of claim 12, wherein the first metal pad and the second metal pad are connected to each other in a bonded manner.

19. A memory system comprising:
a memory device; and
a memory controller configured to transmit a physical unclonable function (PUF) data request command to the memory device in response to an authentication request received from a host, and generate an authentication key based on PUF data received from the memory device,
wherein the memory device includes
a memory cell region including word lines stacked in a first direction, channel structures passing through the word lines in the first direction, and a first metal pad;
a peripheral circuit region including a second metal pad and connected to the memory cell region in the first direction by the first metal pad and the second metal pad; and
a PUF circuit including a plurality of through electrodes passing through the memory cell region in the first direction, and configured to
generate PUF data according to resistance values of the plurality of through electrodes, and
generate the PUF data based on a node voltage between through electrodes connected in series, among the plurality of through electrodes.

20. The memory system of claim 19, wherein the memory cell region is divided into a cell region in which the channel structures are arranged, a word line step region, and a peripheral region, and
wherein the plurality of through electrodes includes at least one of
a first through electrode formed in the cell region;
a second through electrode formed in the word line step region; and
a third through electrode formed in the peripheral region.

* * * * *